US006972682B2

(12) United States Patent
Lareau et al.

(10) Patent No.: US 6,972,682 B2
(45) Date of Patent: Dec. 6, 2005

(54) MONITORING AND TRACKING OF ASSETS BY UTILIZING WIRELESS COMMUNICATIONS

(75) Inventors: Neil William Lareau, Duluth, GA (US); Ronald Earl Wagner, Winter Springs, FL (US); Robert W. Baggerman, Atlanta, GA (US); Gisele Welch, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 355 days.

(21) Appl. No.: 10/324,422

(22) Filed: Dec. 20, 2002

(65) Prior Publication Data

US 2003/0137968 A1 Jul. 24, 2003

Related U.S. Application Data

(60) Provisional application No. 60/349,533, filed on Jan. 18, 2002, provisional application No. 60/378,731, filed on May 8, 2002, and provisional application No. 60/350,601, filed on Jan. 22, 2002.

(51) Int. Cl.[7] ............................................... G08B 13/14
(52) U.S. Cl. ............................... 340/568.1; 340/572.1; 340/539.1; 340/5.92; 340/825.49; 709/222; 370/256; 370/310; 370/315
(58) Field of Search ........................... 340/568.1, 572.1, 340/3.1, 539.1, 5.92, 5.2, 5.8, 825.36, 825.49; 705/28; 709/220, 221, 222; 370/346, 312, 315, 25, 237, 238; 342/357.07; 235/385, 384

(56) References Cited

U.S. PATENT DOCUMENTS

| 3,426,326 | A | 2/1969 | Goldstein ................. 340/10.1 |
| 4,041,470 | A | 8/1977 | Slane et al. .................. 701/35 |
| 3,780,368 | A | 12/1978 | Northeved et al. ...... 340/10.32 |
| 4,688,026 | A | 8/1987 | Scribner et al. ............ 235/385 |
| 4,688,244 | A | 8/1987 | Hannon et al. ............... 377/58 |

(Continued)

FOREIGN PATENT DOCUMENTS

| EP | 0 369 662 A2 | 5/1990 |
| EP | 0 512 543 A2 | 11/1992 |
| EP | 0 575 753 A2 | 12/1993 |
| EP | 0 615 645 B1 | 9/1994 |
| EP | 0 631 259 A2 | 12/1994 |
| GB | 2193359 | 2/1988 |
| GB | 2 193 359 A | 2/1988 |
| JP | 61-203021 | 9/1986 |
| JP | 1-214504 | 8/1989 |
| JP | 3-4303 | 1/1991 |
| JP | 4-233490 | 8/1992 |
| JP | 6-124375 | 5/1994 |
| JP | 7-20237 | 1/1995 |
| JP | 7-30961 | 1/1995 |
| JP | 8-73009 | 3/1996 |
| WO | WO 92/08148 | 5/1992 |
| WO | WO 93/05485 | 3/1993 |
| WO | WO 93/11517 | 6/1993 |
| WO | WO 96/16387 | 5/1996 |

OTHER PUBLICATIONS

Hill, et al., "A System Architecture for Networked Sensors", Nov. 13, 2000.

(Continued)

Primary Examiner—Benjamin C. Lee
(74) Attorney, Agent, or Firm—Thomas, Kayden, Horstemeyer & Risley, L.L.P.

(57) ABSTRACT

Systems, devices, methods, and programs disclosed herein provide a solution for monitoring and tracking assets by utilizing wireless communications. A representative system for monitoring assets includes a remote monitoring station (RMS) and a network of identification (ID) tags. Each ID tag is coupled to an asset and is configured to wirelessly communicate with other ID tags in the network within a predetermined proximity. Each tag is also configured to relay communications from other ID tags so that a communication path is established between the RMS and any ID tag in the network, either directly or via other ID tags.

29 Claims, 8 Drawing Sheets

U.S. PATENT DOCUMENTS

| | | | | |
|---|---|---|---|---|
| 4,740,792 A | | 4/1988 | Sagey et al. | 342/457 |
| 4,750,197 A | | 6/1988 | Denekamp et al. | 455/404.2 |
| 4,816,824 A | | 3/1989 | Katz et al. | 340/5.86 |
| 4,851,815 A | | 7/1989 | Enkelmann | 340/571 |
| 4,862,160 A | | 8/1989 | Ekchian et al. | 340/10.32 |
| 4,918,425 A | | 4/1990 | Greenberg et al. | 340/539.3 |
| 4,952,928 A | | 8/1990 | Carroll et al. | 340/10.41 |
| 5,006,996 A | | 4/1991 | Nakamura et al. | 700/215 |
| 5,023,600 A | | 6/1991 | Szklany et al. | 340/572.1 |
| 5,030,807 A | | 7/1991 | Landt et al. | 235/375 |
| 5,081,445 A | | 1/1992 | Gill et al. | 340/572.1 |
| 5,113,344 A | | 5/1992 | Kellogg et al. | 701/35 |
| 5,119,104 A | | 6/1992 | Heller | 342/450 |
| 5,138,614 A | * | 8/1992 | Baumgartner et al. | 370/261 |
| 5,142,278 A | | 8/1992 | Moallemi et al. | 340/436 |
| 5,151,684 A | | 9/1992 | Johnsen | 340/568.1 |
| 5,153,583 A | | 10/1992 | Murdoch | 340/10.34 |
| 5,223,844 A | | 6/1993 | Mansell et al. | 342/357.07 |
| 5,245,534 A | | 9/1993 | Waterhouse et al. | 705/28 |
| 5,317,309 A | | 5/1994 | Vercellotti et al. | 340/10.5 |
| 5,347,274 A | | 9/1994 | Hassett | 340/988 |
| 5,363,425 A | | 11/1994 | Mufti et al. | 379/201.06 |
| 5,396,227 A | | 3/1995 | Carroll et al. | 340/825.36 |
| 5,434,775 A | | 7/1995 | Sims et al. | 705/8 |
| 5,450,073 A | * | 9/1995 | Brown et al. | 340/3.1 |
| 5,469,363 A | | 11/1995 | Saliga | 700/225 |
| 5,497,140 A | | 3/1996 | Tuttle | 340/10.1 |
| 5,517,194 A | | 5/1996 | Carroll et al. | 340/10.34 |
| 5,519,618 A | * | 5/1996 | Kastner et al. | 701/120 |
| 5,521,602 A | | 5/1996 | Carroll et al. | 340/10.41 |
| 5,528,232 A | | 6/1996 | Verma et al. | 340/825.49 |
| 5,537,460 A | | 7/1996 | Holliday, Jr. et al. | 455/435.1 |
| 5,539,775 A | | 7/1996 | Tuttle et al. | 375/145 |
| 5,543,780 A | | 8/1996 | McAuley et al. | 340/572.1 |
| 5,546,540 A | | 8/1996 | White | 709/223 |
| 5,565,858 A | | 10/1996 | Guthrie | 340/10.33 |
| 5,588,005 A | * | 12/1996 | Ali et al. | 370/346 |
| 5,589,821 A | | 12/1996 | Sallen et al. | 340/573.4 |
| 5,608,721 A | * | 3/1997 | Natarajan et al. | 370/238 |
| 5,621,798 A | * | 4/1997 | Aucsmith | 380/271 |
| 5,627,517 A | | 5/1997 | Theimer et al. | 340/572.1 |
| 5,627,544 A | * | 5/1997 | Snodgrass et al. | 342/42 |
| 5,629,981 A | | 5/1997 | Nerlikar | 713/168 |
| 5,646,616 A | | 7/1997 | Komatsu | 340/988 |
| 5,648,765 A | | 7/1997 | Cresap et al. | 340/10.4 |
| 5,664,113 A | | 9/1997 | Worger et al. | 705/28 |
| 5,673,037 A | | 9/1997 | Cesar et al. | 340/10.32 |
| 5,680,106 A | | 10/1997 | Schrott et al. | 340/10.33 |
| 5,686,888 A | | 11/1997 | Welles, II et al. | 340/539.13 |
| 5,686,902 A | | 11/1997 | Reis et al. | 340/10.2 |
| 5,742,237 A | | 4/1998 | Bledsoe | 340/825.49 |
| 5,745,037 A | | 4/1998 | Guthrie et al. | 340/573.4 |
| 5,768,140 A | | 6/1998 | Swartz et al. | 700/225 |
| 5,774,876 A | * | 6/1998 | Woolley et al. | 705/28 |
| 5,793,630 A | | 8/1998 | Theimer et al. | 700/11 |
| 5,798,693 A | | 8/1998 | Engellenner | 340/10.33 |
| 5,850,181 A | | 12/1998 | Heinrich et al. | 340/572.1 |
| 5,850,187 A | | 12/1998 | Carrender et al. | 340/10.6 |
| 5,856,788 A | | 1/1999 | Walter et al. | 340/10.2 |
| 5,910,776 A | | 6/1999 | Black | 340/10.1 |
| 5,926,101 A | * | 7/1999 | Dasgupta | 340/825.02 |
| 5,942,987 A | | 8/1999 | Heinrich et al. | 340/10.42 |
| 6,028,857 A | | 2/2000 | Poor | 370/351 |
| 6,040,773 A | | 2/2000 | Poor | 340/572.1 |
| 6,058,374 A | | 5/2000 | Guthrie et al. | 705/28 |
| 6,127,928 A | * | 10/2000 | Issacman et al. | 340/572.1 |
| 6,128,549 A | | 10/2000 | Swartz et al. | 700/225 |
| 6,150,961 A | * | 11/2000 | Alewine et al. | 340/995 |
| 6,172,596 B1 | | 1/2001 | Cesar et al. | 340/10.41 |
| 6,226,300 B1 | * | 5/2001 | Hush et al. | 370/437 |
| 6,252,508 B1 | | 6/2001 | Vega et al. | 340/572.1 |
| 6,275,476 B1 | * | 8/2001 | Wood, Jr. | 370/312 |
| 6,329,916 B1 | | 12/2001 | Dames | 340/572.6 |
| 6,333,690 B1 | | 12/2001 | Nelson et al. | 340/539.21 |
| 6,405,102 B1 | | 6/2002 | Swartz et al. | 700/225 |
| 6,411,213 B1 | | 6/2002 | Vega et al. | 340/573.3 |
| 6,466,634 B1 | | 10/2002 | O'Toole et al. | 375/374 |
| 6,542,114 B1 | * | 4/2003 | Eagleson et al. | 342/357.01 |
| 6,614,764 B1 | * | 9/2003 | Rodeheffer et al. | 370/254 |

OTHER PUBLICATIONS

The Wall Street Journal Business bulletin: Source tagging, *Wall Street Journal,* (Eastern edition), New York, NY: Dec. 30, 1993, pp A1, 1 page.

The Wall Street Journal, "Radio Tags Trigger Train Identification", Machalaba, Daniel, *Wall Street Journal,* (Eastern edition), New York, NY, May 10, 1990, pp B1, 1 page.

Brian Martin—Abstract entitled, "WatchIt™ A Fully Supervised Identification, Location and Tracking System", 1995 IEEE, pp 306–310, 5 pages.

C. B. Wong and Grennady Reshetnikov, Abstract entitle, "Hybrid Tracking Technology", 1994 IEEE, 6 pages.

Article entitled, "Radio Tags Trigger", 3 pages.

Alfred R. Koelle, Abstract entitled, "Short Range UHF Telemetry System Using Passive Transponders for Vehicle ID and Status Information", AMTECH Technology Corp., pp 34–38, 1988 IEEE, 5 pages.

* cited by examiner

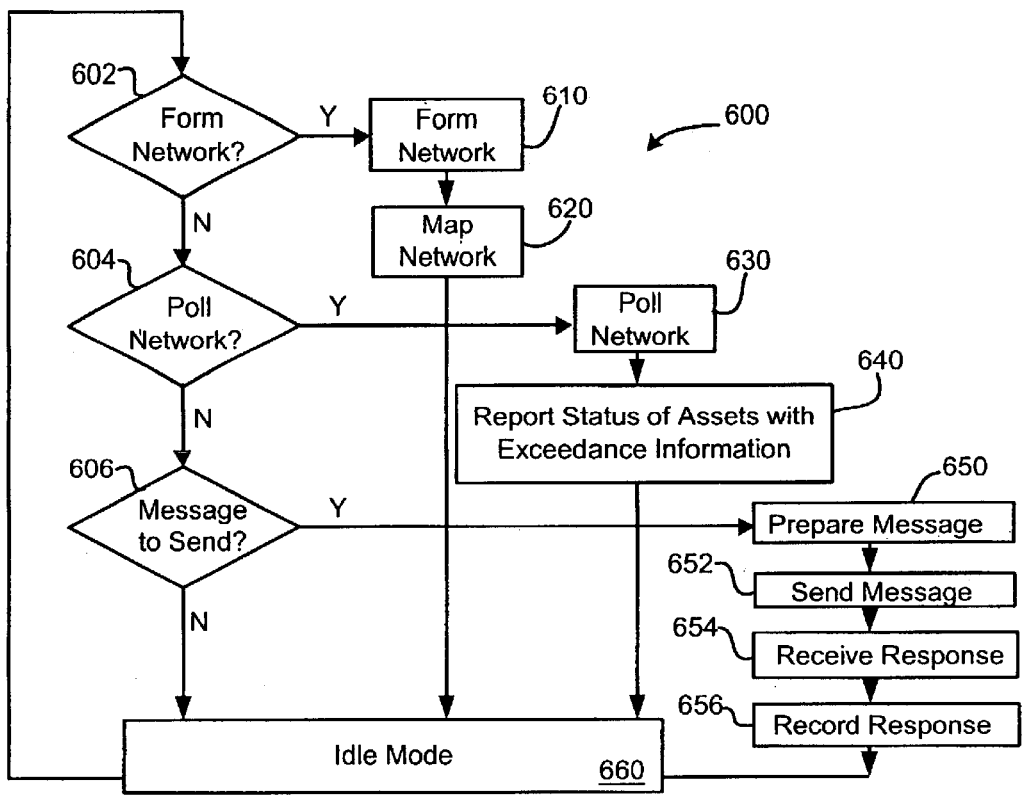
FIG. 8
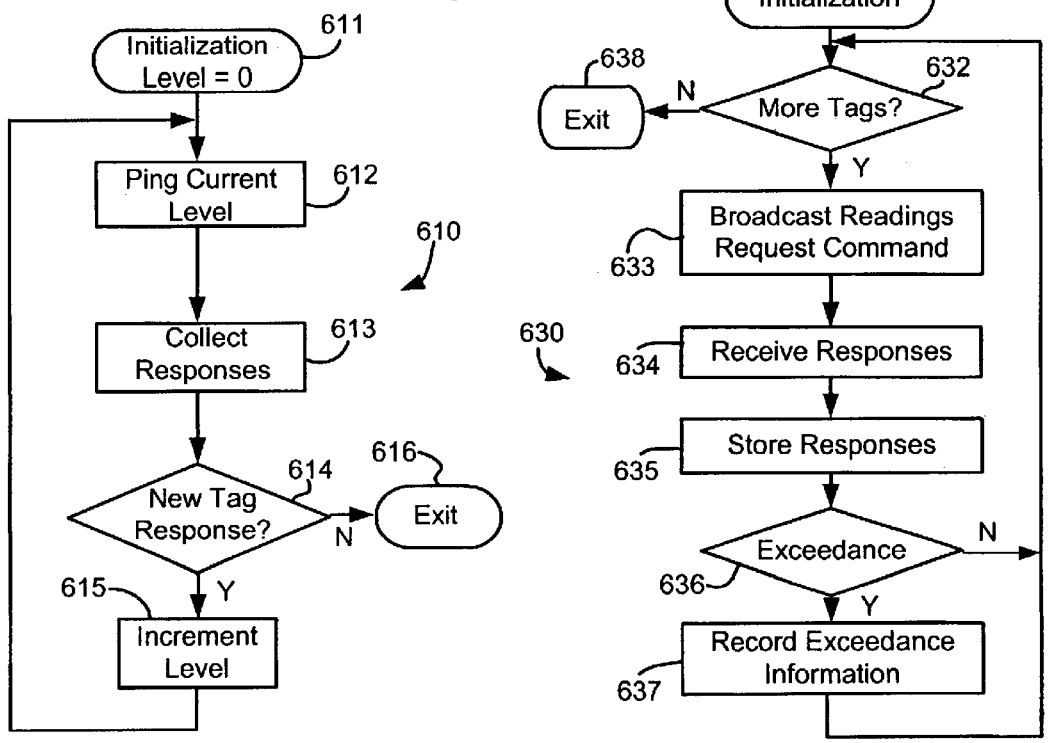
FIG. 9     FIG. 10

MONITORING AND TRACKING OF ASSETS BY UTILIZING WIRELESS COMMUNICATIONS

CROSS REFERENCE TO RELATED APPLICATION

This application claims priority to copending U.S. Provisional Application entitled "Implementation of a Low Power Pallet Network for the Tracking of Goods in a Supply Chain," assigned Application No. 60/349,533, filed Jan. 18, 2002, U.S. Provisional Application entitled "Implementation of a Low Power Pallet Network for the Tracking of Goods in a Supply Chain," assigned Application No. 60/378,731, filed May 8, 2002, and U.S. Provisional Application entitled "System for an Integrated Sensor RF Identification (ISRFID) with Scalable Location Capabilities and Error Correction," assigned Application No. 60/350,601, filed Jan. 22, 2002 which are all entirely incorporated herein by reference.

FIELD OF THE INVENTION

The present invention relates to systems, devices, methods, and programs for monitoring and tracking assets by utilizing wireless communications.

DESCRIPTION OF THE RELATED ART

The supply chain management industry, like most industries, has seen great advances due in large part to the technology boom resulting from the Internet. Today, goods can be tracked with moderate success from source to destination. For example, package delivery companies, such as Federal Express® (FedEx®) and United Parcel Service® (UPS®), provide a package shipping feature in which a user, typically the sender or receiver, can track the current location in the supply chain of a shipped package. Both FedEx® and UPS® command a market premium due in part to this value-added service.

Package delivery companies focus mainly on small items, such as envelopes and small packages. There is a need in the shipping industry for similar tracking systems for high-value assets, such as International Standards Organization (ISO) cargo containers, automobiles, and ammunitions. These goods often travel long distances across different shipping mediums, such as ships, trains, and trucks. At each hand-off, from for example, ship to truck, the presence of assets may be recorded. In this manner, each asset's location can be reasonably tracked across the supply chain. Unfortunately, however, most of the systems in place today are pieced together to form a tracking system across the entire supply chain. These hybrid systems are prone to lose asset visibility when assets move from one form of asset tracking to another. For example, the inventory system at a shipyard is often different from the inventory system at a warehouse. Each inventory system may utilize different technology, and so may require different means of identifying each asset, adding cost and increasing the chance for lost visibility.

Tracking the assets in a temporary storage location, such as a warehouse or shipyard, is another aspect of the supply chain. Assets arrive and depart from warehouses continuously, and so tracking the location of the assets within the warehouse is difficult. Two general families of wireless technology exist for monitoring assets in a warehouse. Both families utilize radio frequency (RF) wireless identification (ID) tags.

The first of such technologies utilizes passive RFID tags. The tags are often coupled to the shipping pallets that hold the assets to be monitored. The monitoring is performed by a gateway which is a restricted space that contains strong electric magnetic fields. The field energizes and queries the passive RFID tags as the tags pass through the gateway. Computers at the gateway can thus monitor the goods entering and leaving the warehouse, or sections thereof. The strength of gateway systems is that the tags are relatively cheap, in large part because they are passive (requiring no batteries). For similar reasons, the tags last for an indefinite period of time. One drawback to these systems is that they require the goods to be passed through designated gateway areas, typically causing great inconvenience. Another drawback is that it is not possible to track the location of the goods within the warehouse. Further, a gateway system must be set up at each warehouse, train depot, shipyard, etc.

The second family of technologies utilizes triangulation systems appropriately set up within the warehouse. The triangulation system typically requires multiple antennas to be positioned in the warehouse. The system utilizes the antennas to periodically interrogate active RFID tags on the assets. When the tag responds to the interrogation, the multiple antennas can triangulate the location of the tag. The tags typically require a battery to power a transceiver. The transceiver typically requires considerable power, so as to transmit a fairly strong signal because the antennas are typically positioned relatively far away. The strength of the triangulation system is that assets can be located within the warehouse on demand and with sufficient accuracy. One drawback is that the battery life of the tags is shortened because of the required strong transmit signal. Another drawback is that the antenna network is typically inflexible and so provides limited coverage within a warehouse. Further, simple configurations of a triangulation system can cost well over $100,000 for the antenna arrays alone. Similar to the gateway system, a triangulation system must be set up at each warehouse, train depot, shipyard, etc.

Based on the foregoing, it should be appreciated that there remains a need for improved systems and methods that address the aforementioned and/or other shortcomings of the prior art. For example, there remains a need for a relatively low-cost asset monitoring system that can be implemented across an entire supply chain and require little maintenance. Accordingly, it would be beneficial if such high-value assets could be monitored across the supply chain with greater accuracy without adding substantial cost.

SUMMARY OF THE INVENTION

Systems, devices, methods, and programs disclosed herein provide a solution for monitoring and tracking assets by utilizing wireless communications. In particular, the solution provides for in-transit visibility of the existence, location, and conditions of the assets throughout a supply chain. Furthermore, the solution requires minimal new infrastructure and can be integrated with many existing supply chain infrastructures.

Accordingly, one embodiment of a system for monitoring assets includes a remote monitoring station (RMS) and a network of identification (ID) tags. Each ID tag is coupled to an asset and is configured to wirelessly communicate with other ID tags in the network within a predetermined proximity. Each tag is also configured to relay communications from other ID tags so that a communication path is established between the RMS and any ID tag in the network, either directly or via other ID tags.

Another embodiment of the present invention may be construed as a wireless ID tag coupled to an asset to be tracked, wherein the wireless ID tag is one of a network of ID tags configured to communicate with an RMS. The wireless ID tag includes a portable power supply and a transceiver configured to wirelessly communicate with other ID tags within a predetermined proximity. The determined proximity is a function of the power supplied by the portable power supply. The wireless ID tag also includes memory configured to store information about the asset upon which the ID tag is coupled. The memory is further configured to store logic for various algorithms. The wireless ID tag also includes a processor for executing the logic for the various algorithms stored in memory. One of the various algorithms comprises relaying communications from other ID tags such that a communication path is established between the RMS and any ID tag in the network, either directly or via other ID tags.

Still another embodiment may be construed as a system for monitoring assets across a supply chain. The system includes a plurality of wireless radio frequency (RF) ID tags each coupled to an asset to be monitored. Each wireless RF ID tag includes means for communicating with other wireless RF ID tags within a predetermined proximity such that a plurality of networks of wireless RF ID tags are formed across the supply chain. Each network comprises those wireless RF ID tags within proximity of each other. The system also includes a plurality of RMSs positioned across the supply chain, wherein each RMS includes means for communicating with any network of the plurality of networks that is within proximity of the RMS. The system also includes a central monitoring station (CMS) that includes means for communicating with the plurality of RMSs.

Yet another embodiment of the present invention may be construed as a method of monitoring assets across a supply chain, whereby each asset has an ID tag coupled thereto. The method includes: forming a network of ID tags such that existence in the network conveys the existence and location of the corresponding assets in the supply chain; and polling the network of ID tags to monitor the environmental conditions surrounding the corresponding assets.

Finally, another embodiment of the present invention may be construed as a computer readable medium having a program for monitoring assets across a supply chain, whereby each asset has an ID tag coupled thereto. The program includes logic configured to form a network of ID tags such that existence in the network conveys the existence and location of the corresponding assets in the supply chain. The program also includes logic configured to poll the network of ID tags to monitor the environmental conditions surrounding the corresponding assets.

Clearly, some embodiments of the invention may address shortcomings of the prior art in addition to, or in lieu of, those described here. Additionally, other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 8 is a flowchart illustrating a method of operation of an RMS in accordance with embodiments of the present invention.

FIG. 9 is a flowchart illustrating in more detail the step of forming a network of wireless RFID tags of the method of FIG. 8.

FIG. 10 is a flowchart illustrating in more detail the step of polling a network of wireless RFID tags of the method of FIG. 8.

DETAILED DESCRIPTION

As will be described in greater detail herein, systems, devices, methods devices, and programs of the present invention facilitate the monitoring of the location and condition of assets. In particular, the present invention provides for a low-cost solution that can locate an asset across a supply-chain, including within a storage facility, and can also monitor the environmental conditions, such as temperature and air pressure, affecting the asset, both while being stored and in transit.

Figure 1:
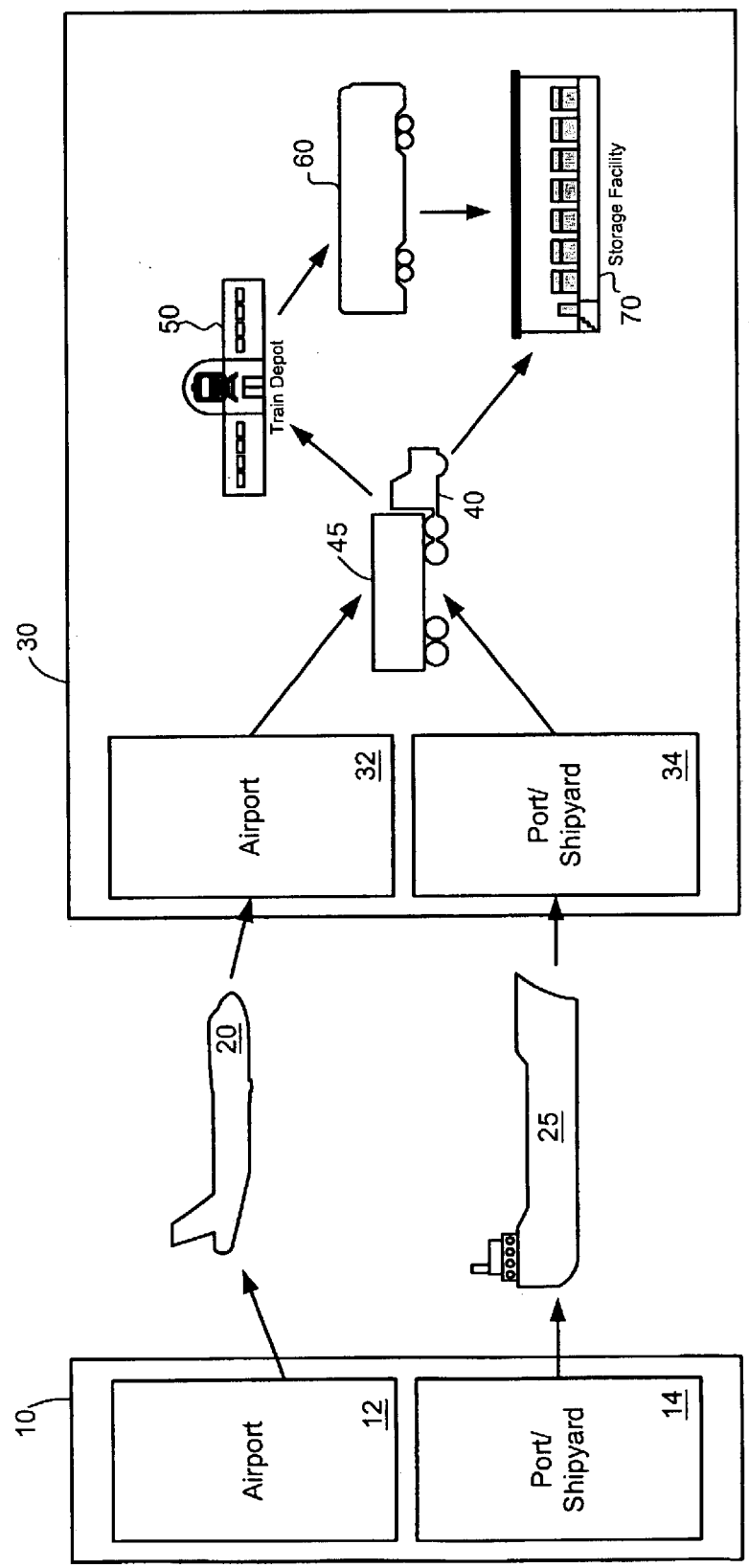
FIG. 1 is a schematic representation of a supply chain for shipping goods from source to destination.

Referring now in more detail to the drawings, in which like numerals indicate corresponding parts throughout the several views, FIG. 1 is a schematic representation of a supply chain 1 for shipping goods from a source 10 to a destination 30. For example, the source 10 may be a city, such as Hong Kong, and the destination 30 may be a country, such as the United States. The supply chain 1 described herein attempts only to show the general components needed in shipping goods from one location to another, as well as showing several examples in which embodiments of the present invention may be found. In reality, a supply chain is often customized to the particular goods shipped, as well as to the parties shipping the goods.

The source 10, may include, among other shipping gateways, an airport 12 and a ship port, or shipyard 14.

Often, overseas shipping for large commercial goods, or assets, is performed via cargo ships 25, whereas shipping for small commercial goods, such as mail and small packages, is performed via airplanes 20. As will become clear later, several embodiments of the invention may also be utilized for military purposes. Militaries often ship heavy assets, including ammunitions and personnel, via cargo ships 25 as well as cargo airplanes 20.

A destination 30 will include a reciprocating airport 32 and shipyard 34 for in-bound vessels 20 and 25. As is well known, both inbound and outbound transit is conducted at both airports 32 and shipyards 34. Great confusion at these locations leads to inefficient shipping, lost assets-in-transit, and reduced security. Embodiments of the present invention may be found in source airport 12, source shipyard 14, destination airport 32 and destination shipyard 34 to help reduce the confusion by, among other things, tracking the locations of the assets-in-transit. Furthermore, embodiments of the present invention may be found on the shipping vessels themselves (i.e., airplane 20 and cargo ship 25). Several of these embodiments will be discussed in further detail in subsequent figures.

Once the goods have reached the gateway (i.e., airport 32 or shipyard 34) of the destination 30, more shipping is performed to provide the goods to their final destination. In this example, the final destination is a storage facility 70, such as a warehouse. In practice, the supply chain 1 does not end at the storage facility 70, as several more destinations, such as retail or wholesale locations, may exist prior to the goods being received at their ultimate destination, typically a consumer. Quite often, trucks 40 ship goods from airport 32 and shipyard 34 to storage facility 70. Alternatively, trucks 40 may ship goods to a train depot 50, where the goods are placed on trains 60 for further shipping. Embodiments of the invention may be found at a storage facility 70, such as a warehouse or factory, as well as a train depot 50. Furthermore, embodiments of the present invention may be found on trucks 40 as well as trains 60. Subsequent figures will provide greater detail to these embodiments.

The shipping industry has standardized many aspects of shipping. One such way is by the use of International Standards Organization (ISO) containers 45. ISO containers 45 are typically steel containers that may store several pallets of goods, or assets. The containers 45 are typically shipped overseas on large shipping vessels, such as cargo ship 25. The cargo ship 25 may carry several hundreds of the containers 45, which are typically stacked on top of each other. At the shipyard 34, large cranes are used to remove the ISO containers 45 from the ships. The containers 45 are temporarily stored at the shipyard 34 until a truck 40 or train 60 is available. The containers 45 can then be placed on the truck 40, or train 60, where shipping of the container 45 proceeds. The contents of the container 45 are often removed once the container 45 reaches a storage facility 70, such as a warehouse. As will become evident in further figures, embodiments of the invention may be found inside an ISO container 45 to track its contents. Embodiments of the invention may also be implemented to track the ISO containers themselves. It should also be noted, that other goods, particularly heavy assets, such as automobiles and tanks, that may be shipped without the use of ISO containers 45 can also be tracked by embodiments of the present invention.

It should be noted that the term assets has been utilized to describe several objects that may be shipped. These objects may be for example, but not limited to, goods, such as raw materials, food, automobiles as well as military assets such as ammunitions, tanks, and personnel. In the broadest sense, the term asset may be considered anything that is movable and thus can be shipped.

Figure 2:
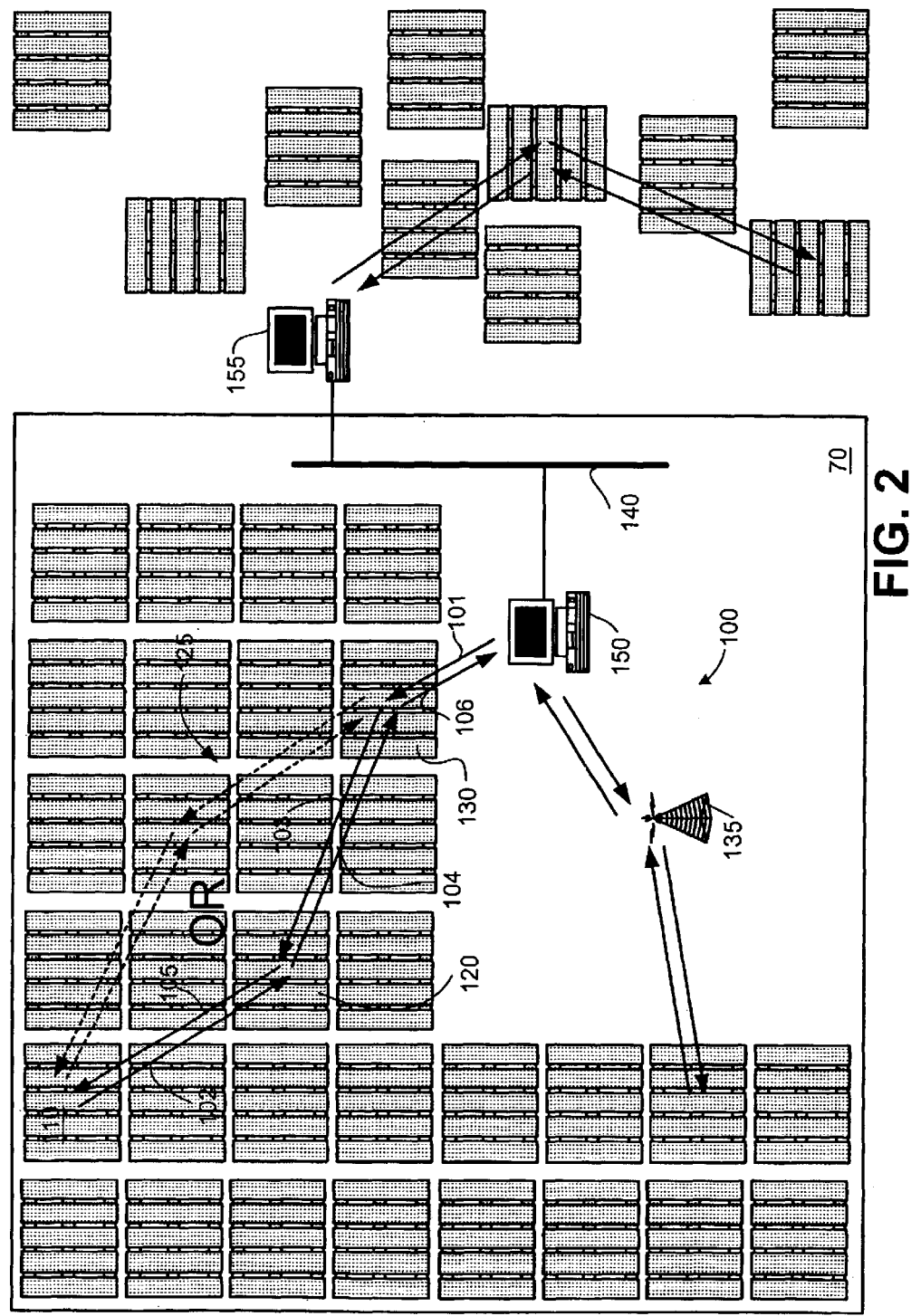
FIG. 2 is a schematic representation of several embodiments of an asset monitoring system implemented in the storage facility of FIG. 1.

FIG. 2 is a schematic representation of several embodiments of an asset monitoring system 100 implemented in the storage facility 70 of FIG. 1. The storage facility 70 may be a structure such as a warehouse or a factory whereby assets are temporarily held during shipping. Often, the assets are moved in and out of the storage facility 70 at great frequency, causing a need for the relative location of each asset within the facility 70 to be monitored. It is important to note that FIG. 2 provides merely a schematic representation of the facility 70. In reality, the storage facility 70 could contain hundreds or thousands of assets dispersed throughout the facility, and potentially stacked on top of each other. The system 100 is designed to facilitate the most complex layouts of the storage facility 70, including three-dimensional location monitoring.

The asset monitoring system 100 generally includes at least a first remote monitoring station (RMS) 150. In some embodiments, the system 100 may include a network of RMSs placed throughout the facility 70 so as to provide maximum coverage. In FIG. 2, two RMSs 150 and 155 are coupled together by a local area network (LAN) 140, so as to provide support for the system 100 both inside and immediately outside of the facility 70, perhaps on a loading dock. In short, each RMS 150 or 155 includes a wireless transceiver coupled to a computer, such as a personal computer (PC).

Figure 6:
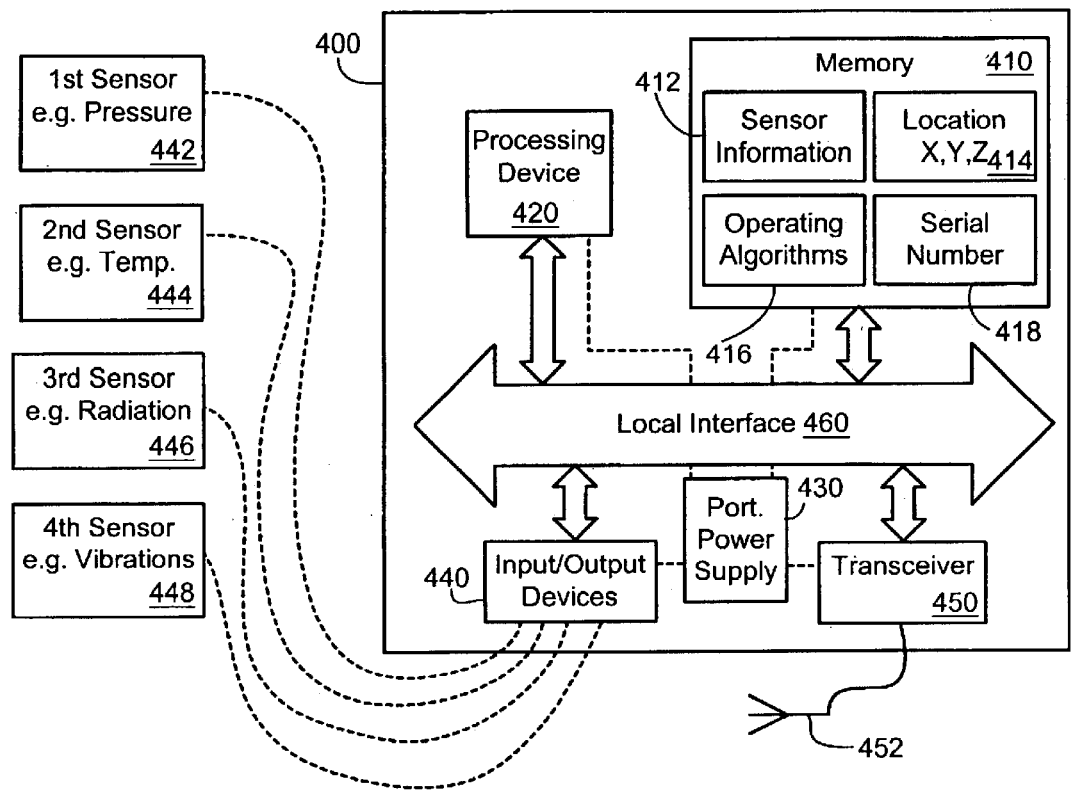
FIG. 6 is a block diagram illustrating embodiment of a wireless RFID tag in accordance with embodiments of the present invention.

Various assets may be dispersed throughout the facility 70. Coupled to each asset is a wireless radio frequency (RF) identification (ID) tag. FIG. 6 will provide more detail about the wireless RFID tags, but in brief, each tag is configured to wirelessly communicate with other tags and any RMSs within a determined proximity. The power consumed by each tag is a direct function of the range of the tag, so the range of each tag will be determined so as to provide for power efficiency. Because of the limited range of the tags, communication between RMS 150 and a destination tag 110, may be relayed via intermediate tags such as tags 120 and 130. Accordingly, each tag can communicate with the RMS 150, either directly or indirectly, thus creating a network of wireless RFID tags. For example, a wireless RFID tag may be capable of communicating within a 50 ft radius. The RMS 150 may be located well over 50 ft away from this tag. In this case, several intermediate tags may be necessary to relay the communications between the RMS 150 and the tag. The present invention can provide for the shortest path between any tag and the RMS 150.

As mentioned, each tag 110, 120, and 130 is coupled to an asset. In conventional supply-chain systems, assets are shipped on pallets, either wooden or steel, whereby a forklift is generally used to move the pallets throughout the facility 70. In general, a wireless RFID tag may be coupled to the pallet holding the assets. In this manner, the trackable pallet can be re-used.

In other embodiments, a dummy wireless RFID tag 135 may be used to relay communications between remote assets and the RMS 150. The dummy wireless RFID tag 135 is essentially the same as the wireless RFID tags, except that it is not coupled to a mobile asset. The dummy wireless RFID tag 135 may be positioned throughout the facility 70, so as to provide better coverage when assets are spread sparingly throughout the facility 70.

The asset monitoring system 100 provides for the communication between any wireless RFID tag among a network of tags and the RMS 150. In FIG. 2, the destination tag 110 is located far enough away from the RMS 150 that intermediate tags are required to relay any communication. The system 100 facilitates communication from the tag 110 to the RMS 150 only after the RMS 150 has requested a communication. In this regard, the RFID tags act as slaves to the RMS 150, the master. As is the case for most master-slave algorithms, the tags (slaves) cannot communicate with one another unless initiated by the RMS (master). The RMS 150 can transmit a downstream communication to the destination tag 110 (coupled to an asset). In the example illustrated in FIG. 2, the downstream communication is relayed from a first intermediate tag 130 (coupled to an asset) to a second intermediate tag 120 (coupled to an asset) to the destination tag 110. The downstream communication, although containing the same payload, can be broken up into segments. The first downstream segment 101 is from RMS 150 to the first intermediate tag 130. The first intermediate tag 130 interprets the first downstream segment 101 and relays it along to the second intermediate tag 120 via a second downstream segment 103. The second intermediate tag 120 does the same and relays the communication along to the destination tag 110 via a third downstream segment 105. The destination tag 110 can process the downstream communication and reply with an upstream communication to the RMS 150. A first upstream segment 102 is received by the second intermediate tag 120 and relayed along to the first intermediate tag 130 via second upstream segment 104. A third upstream segment 106 is communicated to the RMS 150 from the first intermediate tag 130. Once the network has been formed, the path in which a communication may travel can be determined by the RMS 150. Otherwise, the path in which a communication may travel may not be precisely known by the RMS 150, but the path will be communicated to the RMS 150. As will be discussed in further detail in relation to FIG. 7, the path of intermediate tags may be fixed for each destination tag 110 and communicated along with the information from the RMS 150 to the destination tag 110. Alternatively, a broadcast signal may be communicated from the RMS 150, or any intermediate tag, such that any tag within the range of the broadcast can receive and retransmit the signal, if necessary.

Periodically, the RMS 150 may reform the network of tags. The method in which the RMS 150 can accomplish this is described in further detail in FIG. 8. In short, the RMS 150 sends out repetitive broadcast signals and waits for replies to come back. Once all of the replies are from tags already having replied, the RMS 150 is aware of the tags in the surrounding network. Furthermore, the RMS 150 is aware of the relative location of each tag to each other tag because a trail of intermediate tags is recorded for each upstream communication segment. With this information, the RMS 150 has the ability to calculate the shortest path of intermediate tags for each destination tag. As can be seen, some tags closest to the RMS 150 would receive and transmit as intermediate tags more often than others, leading to battery overuse for some of the tags. The RMS 150 can alter the shortest path algorithm for each destination tag so that power use is spread evenly across intermediate tags.

By periodically reforming the network, the RMS 150 can monitor which tags have entered the network and which tags have left the network. Furthermore, the RMS 150 can monitor the relative position of the tags as they may move between reforms of the network. The periodicity of reforming the network may vary according to the asset traffic within the facility 70. For example, for a facility 70 that handles little asset traffic, the network may be reformed once a day. In this regard, if an asset were to arrive and depart before a reform of the network, the asset would not be detected. As another example, the network may be reformed periodically, for example, every fifteen minutes. Accordingly any asset that arrives and departs more than fifteen minutes later will be detected.

The size of the network of tags is limited only by the number and spacing of the tags in the network. Provided there are enough intermediate tags to relay the signals, there is no maximum distance a destination tag must be from the RMS 150. Furthermore, by utilizing more than one RMS 150, the network can be extended beyond the reach of the most remote tags in the network. For example, FIG. 2 illustrates two RMSs 150 and 155. RMS 155 may be used to monitor outside of the facility 70, which may be too far away from the nearest tag inside the facility 70. By networking the RMSs 150 and 155, any asset that exists in or around the facility 70 may be monitored. Furthermore, the movement of assets from inside to outside, or vice versa, can be monitored.

FIG. 2 also illustrates a secondary communication path 125 from RMS 150 to destination tag 110. The RMS 150 is capable of determining an alternative path for communicating with the destination tag 110 if needed. This may occur as a result of an intermediate tag being moved or running out of power. However, as will become evident, the system 100 is configured so that the tags utilize minimum power during operation. Extended battery life for each tag is a main advantage of the system 106, so the prospect of a tag running out of power, although inevitable, is not expected to happen often.

Up until this point, only the relative position of each tag in the network could be calculated. However, an absolute location can also be established for each asset and can be stored in the tag. As mentioned earlier, forklifts are often used to move the assets in, out, and around the facility 70. Once placed at a location, the tag coupled to the particular asset can be programmed with the location. This may be done in a number of ways. One way is to track the location of the forklift that is moving the asset, for instance with an inertial navigation system (INS). Once the asset is placed, the location of the forklift established by the INS, as well as the position of the forklift tines (for height dimension), may be communicated to the tag of the asset. The coordinates (i.e., Cartesian, polar, or spherical) of the location can then be programmed into the memory of the tag. Alternatively, a handheld device, such as a personal desktop assistant, with a positioning system could be used to communicate the location of an asset to the tag. Other equivalent methods could be utilized as well to communicate the information to the tag. Once programmed, the tag may convey such information on the next successive communication with the RMS 150. In this manner, the location of tags in proximity to a tag with a known location can be also found. For example, if a tag with an unknown location can communicate directly with a tag with a known location, then the tag with the unknown location must be within range of the other tag. Using various techniques, the approximate location of the unknown tag can be more precisely found. For example, by finding another tag with a known location that the tag with the unknown location can communicate with can further approximate the location by using various geometry techniques. Obviously, the more tags with a known location, the more accurate the approximate location of the tags with an unknown location. In practice, it would seem likely that either all of the locations are known, or none of the locations are known. In the latter case, only the existence of the asset and the relative distance from the RMS 150 would be known.

As will be better illustrated in FIG. 6, various sensors may be coupled to each asset and may connect to the tag also coupled to the asset. In this manner, various environmental parameters may be monitored and communicated to the RMS 150. For example, temperature, air pressure, vibrations, humidity, and electromagnetic radiation, including ionizing radiation (i.e., alpha and gamma rays), can be sensed. The same general communication protocol can be used to communicate such information between RMS 150 and destination tag 110, via intermediate tags.

Figure 3:
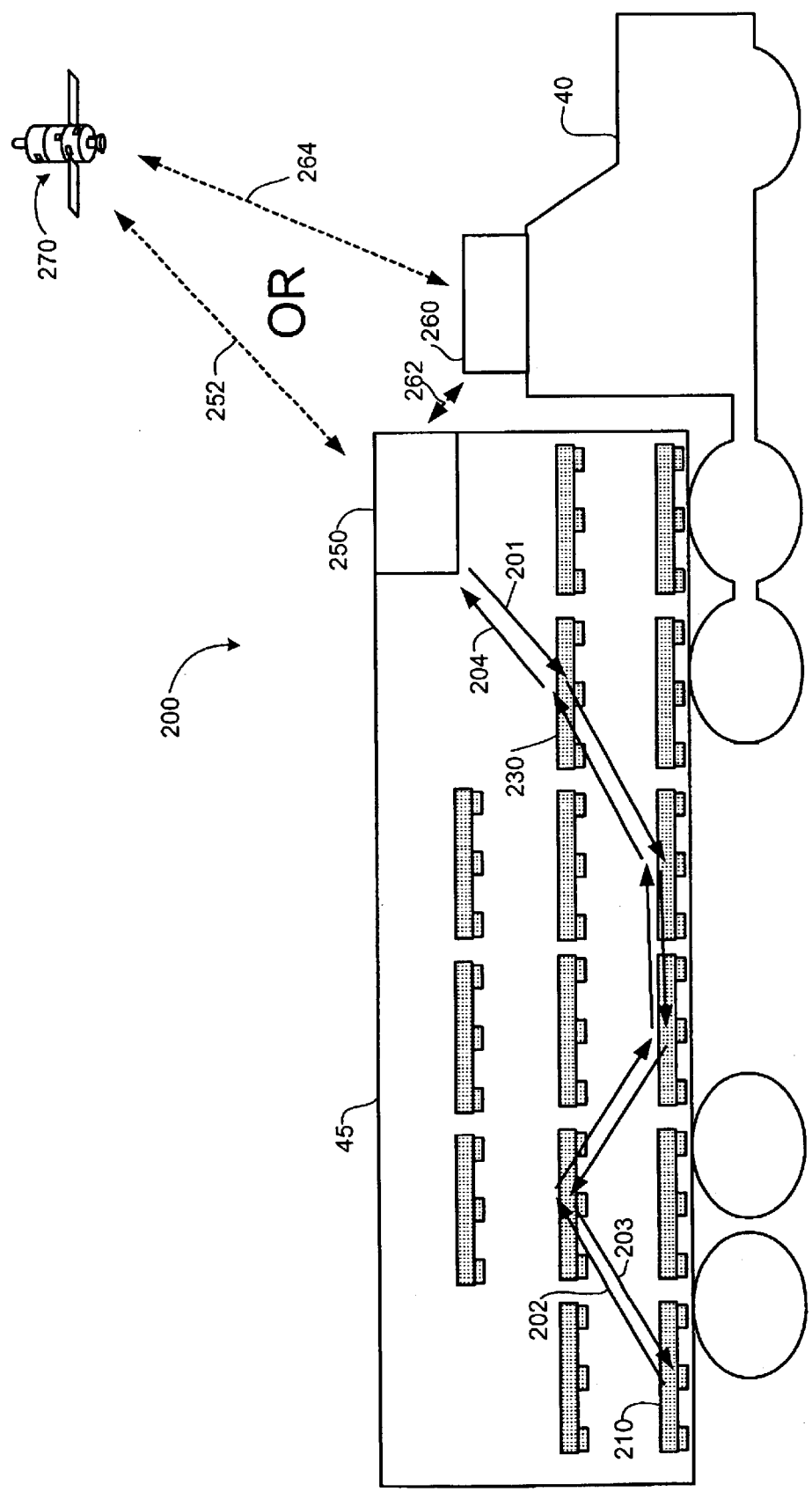
FIG. 3 is a schematic representation of an embodiment of an asset monitoring system implemented in the shipping container of FIG. 1.
Figure 4:
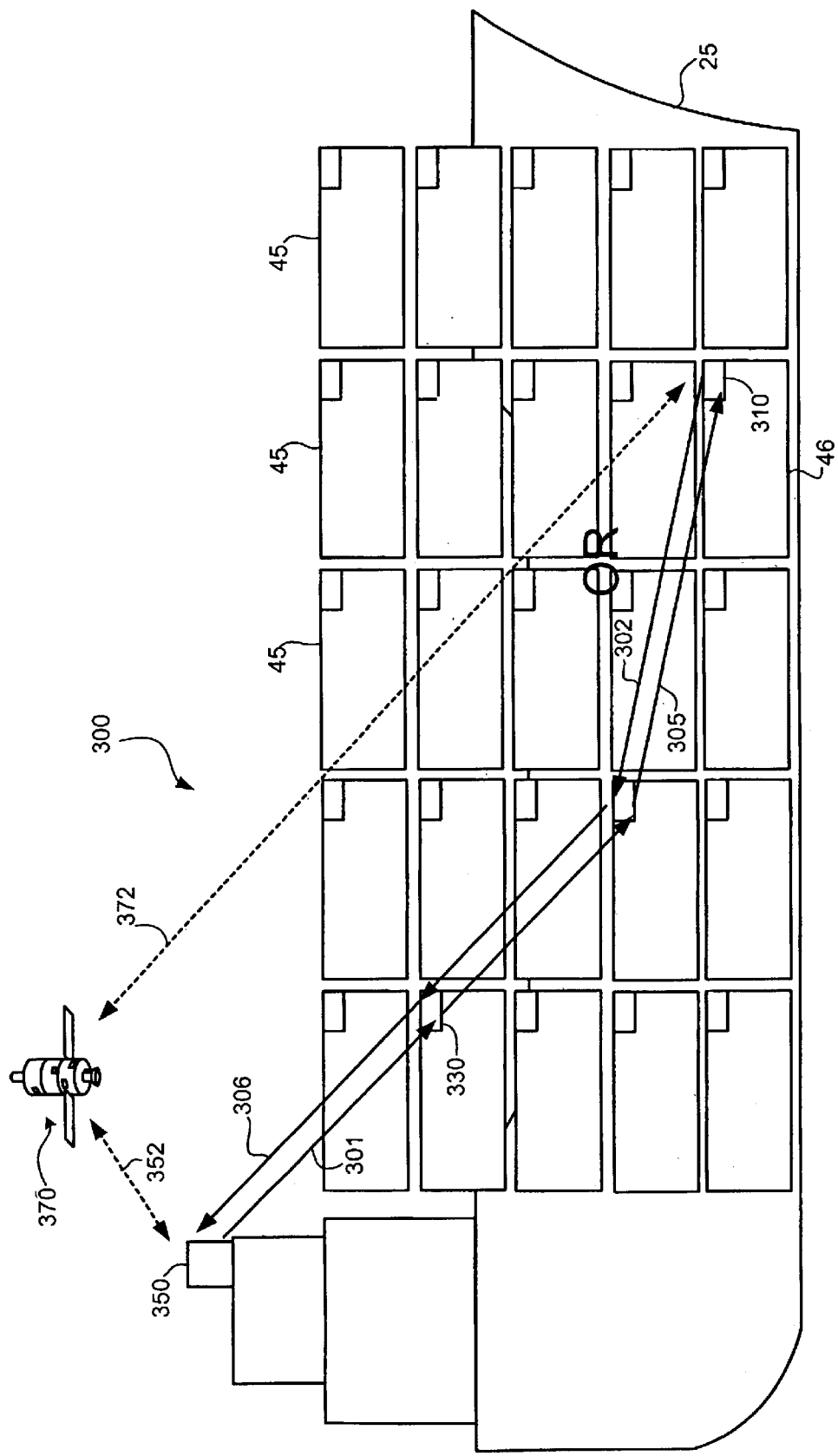
FIG. 4 is a schematic representation of an embodiment of the asset monitoring system implemented in the shipping vessel of FIG. 1.

As will become clear in FIGS. 3 and 4 the same assets that are stored in the storage facility 70 are often shipped overseas. The asset monitoring system 100 can be implemented in various environments where environmental conditions must be considered. Accordingly, these conditions can be monitored throughout the transport of the goods.

The first of such implementations, where environmental conditions may be a factor, is illustrated in FIG. 3, which is a schematic representation of an embodiment of the asset monitoring system 200 implemented in the ISO shipping container 45 of FIG. 1. In this implementation, the location of the assets within the ISO shipping container 45 is obviously not much of a concern, although the location of the ISO shipping container 45 is important. In actuality there are various systems already implemented that provide for such tracking. For example, Qualcomm® Corporation has a system known as OmniTRACS®, which is a two-way satellite communication system that allows trucks to be monitored and tracked and to allow data communication with dispatchers. Other systems, such as Aether System's MobileMax™, Axiom Navigation's Asset Tracking, and Preco's Advanced Asset Management exist that provide essentially the same service. However, none of these systems provide the in-transit visibility of the asset monitoring system 200. The system 200 can effectively monitor the environmental conditions of the assets within the container 45. This information can then be communicated via satellite to a central monitoring station (CMS). Alternatively, a resident system, such as OmniTRACS® may be used to communicate such information from the container to a central location, via satellite, or other communication link.

The system 200 generally includes the same components as the system 100 of FIG. 2. A container communication unit 250 may include similar means as the RMS 150 of FIG. 2 for communicating with a network of wireless RFID tags. The container 45 includes, in its storage, assets often stacked on top of each other. Each asset in the container 45 may have coupled to it a wireless RFID tag that includes various sensors. Collectively, the wireless RFID tags within the container 45 make up a network of tags, where each tag can communicate with the container communication unit 250, either directly or indirectly, via intermediate tags, in the same manner as illustrated in FIG. 2. For example, destination tag 210 may be coupled to an asset which requires several intermediate tags, such as intermediate tag 230 to communicate with the container communication unit 250. A downstream communication signal from the container communication unit 250 may be relayed to the destination tag 210 in segments. Similarly, an upstream communication signal may be relayed from the destination tag 210 to container communication unit 250. In practice, fewer intermediate tags (i.e., tag 230) would be required in this implementation, because of the close proximity of the tags to the container communication unit 250.

The system 200 may perform an initial forming of the network of tags at the start of transit, and may periodically reform the network during transit to check for lost or stolen goods. In practice, the periodicity of the reforming of the network would be greatly decreased in this implementation, for obvious reasons. However, the environmental conditions may be periodically monitored more often in this implementation. For example, each tag in the network may be polled to see if any preprogrammed sensor thresholds have been exceeded since the last poll. This information can be communicated back to the container communication unit 250 from each tag in the network. This will be discussed in more detail in relation to FIG. 9. Practical examples of environmental conditions that may be monitored in this implementation, are vibrations and temperature. Vibration sensitive assets, such as ammunitions for the military, may be equipped to sustain a maximum amount of vibrations during transit. The system 200 can monitor for vibrations during transit, and if the measured vibrations are near the threshold, appropriate actions can be taken. Perhaps a more practical use is to monitor temperature. Various goods, such as food and pharmaceuticals, are sensitive to temperature. By utilizing the system 200, a recipient of the goods will know the temperature environments in which the goods were shipped, which can help in establishing the quality of the goods shipped.

The container communication unit 250 can be configured to relay the information received to a central monitoring station (CMS) (not shown). This may be performed in a number of ways. The first is by communicating with a satellite 270 via a satellite link 252 directly from the container communication unit 250, whereby the container communication unit 250 would include an appropriate transceiver communicate with the CMS via the satellite 270. An alternative method is to communicate with an intermediate transceiver unit 260, which may be mounted to the truck 40 hauling the container 45. In this case, the container communication unit 250 may have the means for communicating with the wireless RFID tags, but not with the satellite 270. A wired or wireless link 262 may be provided to communicate between the transceiver unit 260 and the container communication unit 250. Other equivalents in the art, such as cellular communication, could also be utilized, and should be included herein. It is important to note that the communication links 252 or 264, either from the container communication unit 250 or the transceiver unit 260 may be provided by a third party such as the services discussed above. In this manner, the system 200 can be implemented into an existing structure with little cost.

It should also be noted that the assets, as discussed earlier, are typically shipped on pallets, and the tags would be coupled thereto. The same pallets, and thus the same tags, can be used in the implementation as illustrated in FIG. 2 and FIG. 3. As will become clearer upon discussion of the implementation of FIG. 4, the asset monitoring system provides a modular solution that can be implemented across the entire supply chain.

FIG. 4 is a schematic representation of another embodiment of the asset monitoring system 300 as implemented in the shipping vessel 25 of FIG. 1. This implementation is similar to that of FIG. 3 in that it can provide for in-transit visibility of the environmental conditions of the assets being shipped. FIG. 4 also shows an implementation in which the container communication units, such as unit 250 of FIG. 3, serve as intermediate tags in a network of wireless RFID tags. The system 300 includes a shipping communication unit 350 which includes the equivalent means as the RMS 150 of FIG. 2 for communicating with a network of wireless RFID tags. The network, however, includes the tags coupled to the assets within each cargo container 45, but also the container communication units, which now function as intermediate tags. For example, the shipping communication unit 350 can communicate with an asset located within cargo container 46 via various intermediate tags, which includes the container communication unit 310 of the destination cargo container 46, as well as container communication unit 330. Accordingly, the shipping communication unit 350 may communicate with the CMS (not shown) via satellite 370. The shipping communication unit 350 includes the necessary resources (i.e., a satellite transceiver) to communicate with the satellite 370 via link 352. This service may be provided by a third party service such as Qualcomm's® OmniTRACS®.

In an alternative manner, as also illustrated in FIG. 3, each container communication unit (i.e., 310) may be configured to communicate directly with the satellite 370 via link 372. The environmental conditions within the container 46 could still be communicated to the CMS in this fashion.

Figure 5:
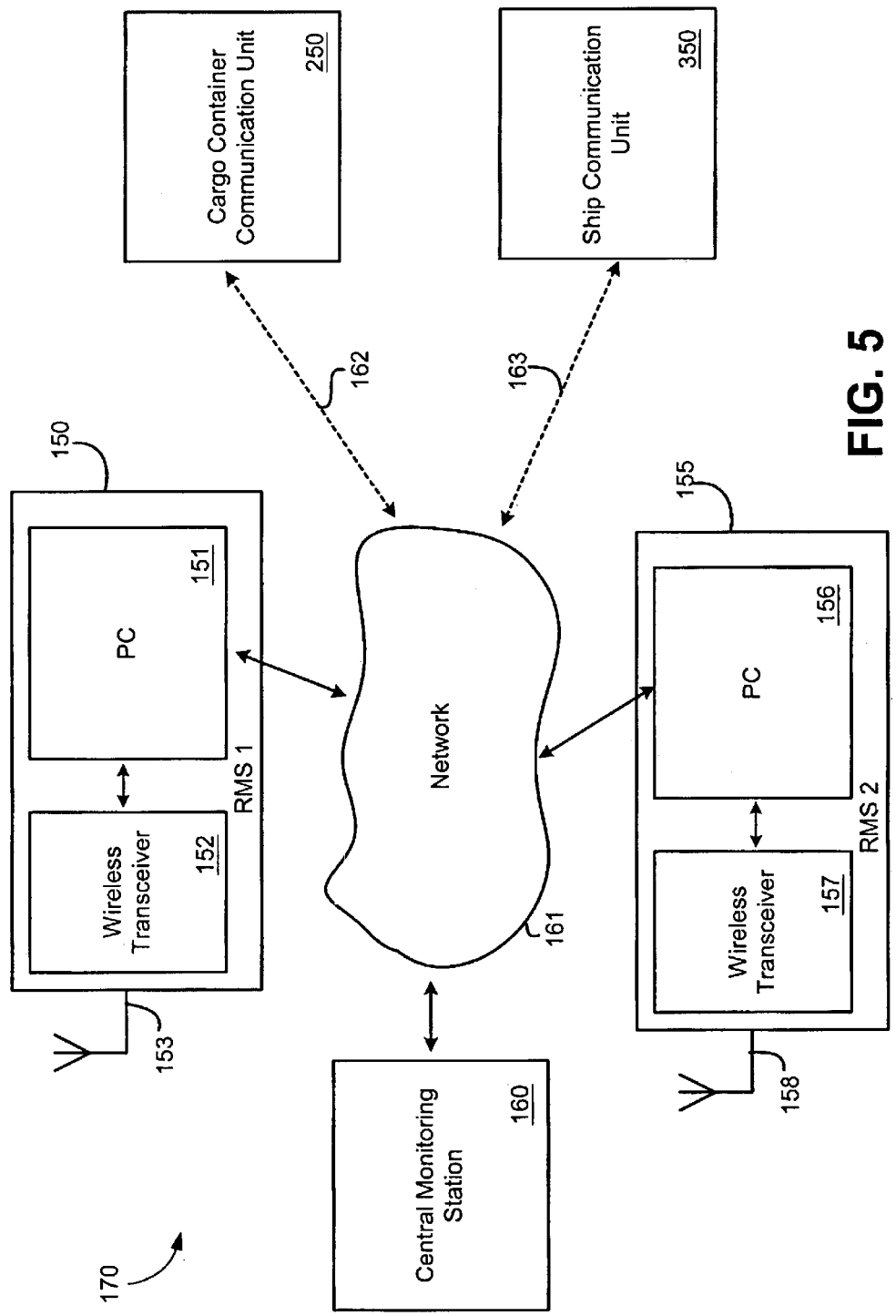
FIG. 5 is a schematic representation of the various asset monitoring systems of FIGS. 2–4 networked together to form one system servicing an entire supply chain.

FIG. 5 is a schematic representation of the various asset monitoring systems networked together to form one system 170 servicing an entire supply chain. The system 170 generally includes a central monitoring station (CMS) 160 coupled to a communication network 161. Also coupled to the network 161 are the various RMSs 150 and 155 from the asset monitoring system 100 configured in the storage facility 70 (See FIG. 2). The container communication unit 250 of the asset monitoring system 200 configured in a cargo container (See FIG. 3) as well as the shipping communication unit 350 of the asset monitoring system 300 configured on the shipping vessel 25 are coupled to the network 161. Collectively these two units will be referred to as communication units. With this configuration, the CMS 160 can monitor the activity and conditions of the various assets across the supply chain.

Although only a handful of implementations have been illustrated, such as in the storage facility 70, the cargo container 45, and the shipping vessel 25, those skilled in the art will appreciate the various other implementations that could be utilized. An asset monitoring system could be implemented in many facilities equivalent to the storage facility 70, such as the shipyard 34, airport 32, and train depot 50 (See FIG. 1). Likewise, an asset monitoring system, could be configured on an airplane 20 as well as a train 60. All of these applications, as well as other equivalents, could easily be implemented and connected to the network 161 such that the CMS 160 could monitor them as well.

The CMS 160, as its name implies, is the central location for access to the remote units (i.e., RMS 150, 155, container communication unit 250, and shipping communication unit 350). The CMS 160 may be configured to communicate in both directions, so that a user at the CMS 160 could not only monitor the information being received by the CMS 160, but could also send a command to, for example, RMS 155 to search for a particular asset, or, as another example, to test the environmental conditions of an asset communicating with the shipping communication unit 350. The CMS 160 may comprise a computer (not shown) with a network interface for communicating with the network 161. Furthermore, the CMS 160 may also include a transceiver for receiving satellite communications from the container communication unit 250 and the shipping communication unit 350. The necessary software and firmware to communicate with the remote units, as well as monitor the assets across the supply chain, may be resident on the computer of the CMS 160.

The network 161 may be any type of communication network in which various computing devices can communicate. For example, but not limited to, the network 161 could be a Local Area Network (LAN) and/or a Wide Area Network (WAN) and could utilize the Internet. The network 161 could be comprised of various hardware components such as routers and bridges (not shown) to facilitate the communication between the various interconnected devices. As illustrated in FIG. 2, the communication between RMS 150 and 155 may be accomplished through a LAN, whereas the communication between the RMS 150 and the CMS 160 may require a WAN and the Internet.

RMS 150 includes a computer, such as PC 151, coupled to a wireless transceiver 152. The wireless transceiver 152 may be coupled to an antenna 153 for communicating with the network wireless RFID tags (See FIG. 2). The wireless transceiver 152 may be external from PC 151 or may be configured internally.

The PC 151 may include a network interface (not shown) for communicating with the CMS 160 and the RMS 155 via the network 161 (either LAN or WAN). The PC 151 also includes, although not shown for clarity, a processor for processing various functions stored in memory, also found in the PC 151. The memory may store firmware and software for the various algorithms needed to monitor the network of wireless RFID tags. These algorithms include those to be described in FIGS. 8, 9, and 10. Furthermore, the memory may include a program for determining the shortest path for each tag in the network, as discussed earlier. RMS 155 includes a PC 156 and a wireless transceiver 157, and generally includes similar hardware and software as RMS 150.

The container communication unit 250, as briefly discussed in FIG. 3, includes similar components as to the RMS 150 for communicating with the network of wireless RFID tags. Likewise, the container communication unit 250 may also include similar software and firmware to perform various algorithms for monitoring the assets. The container communication unit 250 may not necessarily utilize a PC, but instead may utilize a general computer, without any user interface. The CMS 160 may be configured to provide a user interface, remotely, for the container communication unit 250. The unit 250 may also include the necessary transceiver to communicate with the CMS 160 via the satellite 270, or some other communication scheme. The communication link 162 may include a satellite uplink, and a satellite downlink to the CMS 160, which may pass through an intermediate gateway, or server. The satellite 270 can provide a two-way communication, such that the CMS 160 can remotely control the container communication unit 250. Other forms of the communication link 162 may be via a cellular connection to a switched-circuit telephone service, or perhaps through a radio transmission, such as microwave.

The ship communication unit 350 can communicate with the CMS 160 via communication link 163 in much the same manner as the container communication unit 250. The ship communication unit 350 also includes the necessary resources to communicate with a network of wireless RFID tags.

The remote units, such as the ship communication unit 350 may be configured to communicate directly with RMS 150 and 155, but in practice, this would be done indirectly through the CMS 160.

FIG. 6 is a block diagram illustrating an embodiment of a wireless RFID tag 400 in accordance with embodiments of the present invention. The wireless RFID tag 400, as discussed earlier, is coupled to an asset that is to be tracked and monitored. The asset, may be anything in which knowledge of its location and/or environmental surroundings is important, particularly while being shipped. Most of the assets, accordingly, will be of significant value, either monetarily or for security reasons. Examples include: automobiles, ammunitions, and tanks. Further, many assets (e.g., consumer goods) are shipped on pallets. The tag 400 may be coupled to the pallets, which can be re-used many times for different shipments.

Generally, the tag 400 includes a processing device 420, memory 410, a transceiver 450, and an input/output interface 440 all coupled via a local interface 460. Although illustrated as external and exclusive components, a variety of sensors 442, 444, 446, and 448 may be configured with the tag 400, and may be considered as components of the tag 400. The tag 400 may also include a user interface (not shown) for providing interaction from a user. The user interface may include several buttons and switches and a display screen for interacting with a user.

The local interface 460 can be, for example, but not limited to, one or more buses or other wired or wireless connections, as is known in the art. The local interface 460 may have additional elements, which are omitted for simplicity, such as controllers, buffers (caches), drivers, repeaters, and receivers, to enable communications. Further, the local interface 460 may include address, control, and/or data connections to enable appropriate communications among the aforementioned components.

The components of the tag 400 are powered by a portable power supply 430. The portable power supply 430, most likely would be a battery providing extended life. Since the purpose of the system is to track assets in transit, the system itself must meet regulatory requirements for shipping, specifically the system must meet Department of Transportation regulations and international air cargo regulations. Accordingly, the portable power supply 430 must be of a size and construction that does not become hazardous. The design of the tag 400 is such that it may be powered by a lithium battery for over two years using a total quantity of lithium less than 10 grams. Many container storage areas are subject to extremes of heat and cold, therefore the portable power supply 430 and tag 400 combination may be designed to operate from −40C. to 70C. without generating hazardous waste or noxious/corrosive gases. The design of the hardware, protocols, and algorithms is geared toward meeting these objectives. The power supplied by the portable power supply 430 directly affects the transmission and reception range of the transceiver 450 and can be controllably adapted to the environment m which the asset is located. For example, assets inside a cargo container 45 are typically placed closer together and so the distance for a wireless communication to travel is reduced, thus allowing for the reduction in the power supplied by the portable power supply 430. In this manner, power can be conserved.

The processor 420 is a hardware device for executing software or firmware, particularly that stored in memory 410. The processor 460 can be any custom made or commercially available processor, a central processing unit (CPU), an auxiliary processor among several processors associated with the tag 400, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and non-volatile memory elements (e.g., ROM, hard drive, tape, NVRAM, CDROM, etc.). Moreover, the memory 410 may incorporate electronic, magnetic, optical, and/or other types of storage media. Note that the memory 410 can have a distributed architecture, where various components are situated remote from one another, but can be accessed by the processor 420.

The transceiver 450 is configured to facilitate the communication of signals to and from the tag 460. A variety of wireless protocols may be implemented in the tag 460, one of which is a frame based protocol to be discussed in further detail in FIG. 7. The memory 410 includes the necessary resources (e.g., firmware and software) to modulate and demodulate the data for the particular protocol, but the transceiver 450 includes the necessary hardware resources to communicate the information. Such hardware resources may include the necessary circuitry to amplify the downstream and upstream signals, such as gain amplifiers. A variable strength line driver amplifier may be included in the transceiver 450 for controlling the level of output power on the transmitted signal. The strength of the transmitted signal is a direct function of the power supplied by the portable power supply 430. Filters for reducing noise may also be included in the transceiver 450 as well. The transceiver 450 may be coupled to an antenna 452, used for transmitting and receiving the electromagnetic radiation. Preferably, the wireless communications would be performed in the radio frequency band and more preferably around 900 MHz. The transceiver 450 could easily be configured for other frequencies, however, such as 830 MHz (Europe) or 2.4 GHz.

The input/output interface 440 provides an interface for the variety of sensors 442, 444, 446, and 448. As discussed earlier, the sensors 442, 444, 446, and 448 can be used to monitor the environmental conditions surrounding the asset, and thus the tag 400. For example, a first sensor 442 may be configured to measure the air pressure surrounding the asset. This may be particularly useful for implementing the asset monitoring system in the cargo airplane 20 of FIG. 1, or perhaps at a high altitude location. A second sensor 444 may be configured to measure the air temperature surrounding the asset. As discussed earlier, this is particularly useful for implementing the asset monitoring system on a shipping vessel 25, where extreme temperature conditions are a factor. A third sensor 446 may be configured to measure the electromagnetic radiation surrounding the asset, including the total radiation being emitted from the network of wireless RFID tags. Assets, such as ammunitions and missiles are vulnerable to high levels of electromagnetic radiation. By monitoring the radiation emitted by the network, one can be sure that the radiation level in critical areas, such as around ammunitions, is not exceeded. A fourth sensor 448 may be configured to measure vibrations experienced by the asset. Again, assets, such as animunitions and missiles are vulnerable to high levels of vibrations. Other sensors may be configured with the tag 400 to measure a wide variety of other environmental conditions, such as humidity and solar exposure.

The sensors 442, 444, 446, and 448 may be integrated with the tag 400 or, as shown in FIG. 6, may be exclusive to the tag 400 and connected to the tag 400 via the input/output interface 440. Power from the portable power supply 430 may be supplied to the sensors 442, 444, 446, and 448 via the input/output interface 440.

The memory 410, as mentioned, includes a variety of memory elements, such as volatile and non-volatile memory, for storing data. Software and firmware may also be stored in the memory 410 that is configured to provide various functions to the tag 410. It will be appreciated, however, that a key aspect of the invention is the simplicity incorporated into the tag 400, thus keeping the memory 410 to a minimum.

The memory 410 generally comprises a storage location for a unique identifier, such as a serial number 418 designated for each tag 400 upon its creation. The unique serial number 418 is used during wireless communications to identify the tag 400. The contents of the asset may also be linked to the unique serial number 418, however this information will not be conveyed wirelessly. An RMS, or the CMS, upon reception of the unique serial number 418, may correlate the contents of the asset with the unique serial number 418. In this manner, relevant information, which can be intercepted by eavesdroppers, is not communicated wirelessly. The unique serial number 418 may be stored in a simple register, and may be re-programmed at a later time.

Also included in the memory 410 is storage for the coordinate location 414 of the asset. This information, as discussed earlier, may be in the Cartesian coordinate system, perhaps a polar or spherical coordinate system, or a proprietary coordinate system. The coordinate location 414 may be programmed via communication from the RMS, from a wireless communication via a hand-held device, such as a PDA, from an inertial navigation system onboard a forklift, or some other equivalent means. If the tag 400 is so equipped, the coordinate location 414 may be programmed via a user interface, such as the one briefly discussed above. The coordinate location 414, can be re-programmed and several previous locations can remain stored for a chosen period of time.

Various sensor parameters are stored in the memory 410 along with recorded sensor data in the sensor information section 412. The sensor information section 412 may include variable parameters stored in non-volatile memory to help operate the sensors 442, 444, 446, and 448. Such variable parameters may include the time between two successive sensor readings and threshold limits. For example, the time between successive readings may be on the order of 15 minutes or 120 minutes. Threshold limits can be programmed according to the necessary environmental conditions of the asset. For example, a high and low temperature threshold, or a maximum level of electromagnetic radiation. These parameters may be programmed from the RMS or may be programmed in a similar fashion as the coordination location information 414.

Also stored in the sensor information section 412 of the memory are previous readings of the sensors 442, 444, 446, and 448. For example, the sensor information section 412 may be large enough to hold three prior readings for each sensor 442, 444, 446, or 448. Likewise, threshold exceedances for each sensor 442, 444, 446, or 448 may be triggered at any reading and stored in the sensor information section 412. Upon a command from the RMS, the data, such as the sensor readings and threshold exceedances can be communicated back to the RMS. Generally, the sensor information section 412, the coordinate location 414 information, and the serial number 418 will be stored in non-volatile memory.

Several operating algorithms 416 through software and firmware are also stored in the memory 410. The operating algorithms 416 may include the algorithms necessary to communicate with the RMS as well as the other wireless RFID tags in the network. The operating algorithms 416 may also include the algorithms necessary to operate the sensors 442, 444, 446, and 448. Another algorithm potentially included in the operating algorithms 416 may be for managing the output of the portable power supply 430.

The communication algorithms include the resources for modulating and demodulating the wireless communications and preparing and receiving such communications from the transceiver 450 of the tag 400. The modulation protocol incorporated into the communication algorithm may vary greatly by the implementation. Routing and linking algorithms may also be stored among the communication algorithms. These algorithms perform the framing of data frames for communication of data between tags, as well as manipulating the frames for proper routing among the network of wireless RFID tags. A representative data frame 500 in accordance with embodiments of the present invention is illustrated in detail in FIG. 7. An error checking scheme such as a Checksum or a cyclic redundancy check (CRC) scheme can also be stored among the communication algorithms. Temporary memory, such as RAM, may be included in memory 410 for temporarily storing data frame information while communicating.

Also included in the operating algorithms 416 are the appropriate processes to be performed in response to a variety of commands from the RMS. Such commands include storing information received from the RMS, retrieving information, such as sensor information, and replying with requested information, as well as simply replying to inform the RMS of the existence of the tag 400 in the network. More detail about the various commands will be provided in the discussion relating to FIG. 7.

It should be noted that various software and/or firmware programs have been briefly described herein. It will be appreciated that the various software and/or firmware programs, such as the various communication algorithms and command response algorithms, comprise an ordered listing of executable instructions for implementing logical functions. These programs can be embodied in any computer-readable medium for use by or in connection with an instruction execution system, apparatus, or transmission device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the information system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable media would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 7:
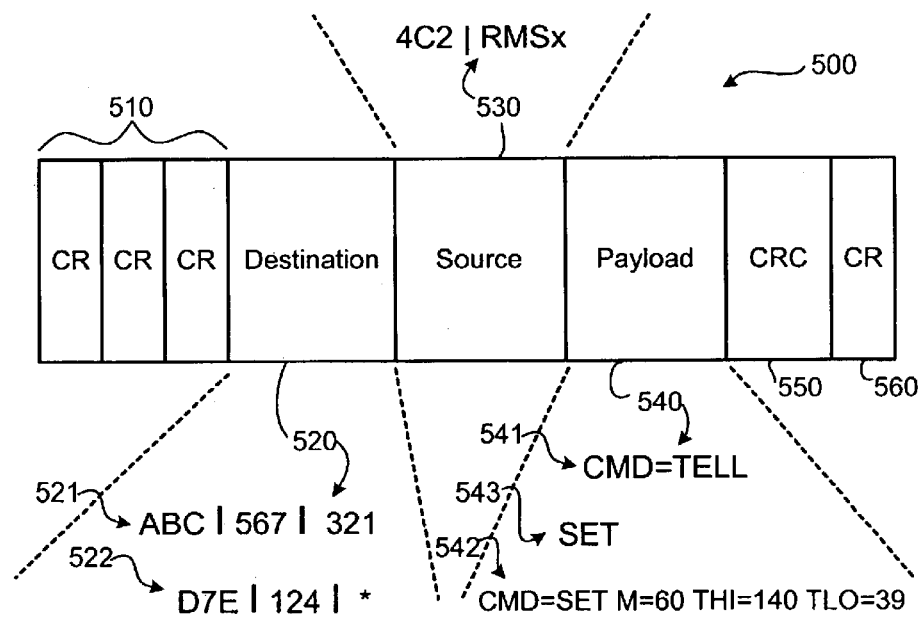
FIG. 7 is a schematic representation of a data frame as used for communicating between a Remote Monitoring Station (RMS) and the wireless RFID tag of FIG. 6.

FIG. 7 is a schematic representation of a data frame 500 as used for communicating between an RMS and a wireless RFID tag. The data frame 500 consists of several fields each containing pertinent information. In the preferred embodiment, the length of the data frame 500 is not fixed, but would have some nominal maximum length in accordance with the size of the memory 410 of the wireless RFID tag 400. The data may be made up of several 8 bit characters, and preferably, but not necessarily made up of 8 bit ASCII characters. It should be appreciated that the data frame 500 is one of many ways available to wirelessly communicate information, and although this represents the currently preferred method, certainly other equivalent methods are available, and should be accordingly protected herewith.

The data frame 500 begins with a header portion 510 that merely identifies the start of the frame 500. A message destination field 520 is next in the frame 500, followed by a message source field 530. The payload 540 including various tokens (i.e., 541, 542, and 543) is next in the frame 500. Following the payload 540 is an error-checking field 550. A trailer portion 560 signifies the end of the data frame 500. Each field of the frame 500 may be delimited from each other by white space.

The header portion 510, in this embodiment, is made up of three consecutive carriage return characters (ASCII-0× 0D) each of which is composed of 8 bits. Utilizing three consecutive similar characters is helpful when synchronizing the communication. Manchester encoding and decoding may be used to synchronize communication, and three characters is often enough to establish synchronization. Manchester encoding is well known in the art. Other predetermined characters could be utilized in place of a carriage return. The header portion 510 is used to signify the start of the data frame 500 and to delimit it from preceding frames.

The message destination field 520 identifies the destination tag for a particular communication as well as the necessary intermediate tags by including a string of unique identifiers of the wireless RFID tags that are to communicate, by relaying, the data frame 500. The unique identifier preferably would be the serial number 418 of each tag. The rightmost serial number is the ultimate destination tag for the data frame 500.

Two example strings of serial numbers 521 are 522 are provided for illustrations purposes. The first string of serial numbers 521, is "ABC|567|321" which signifies that the tag with serial number "ABC" will first receive this frame 500. Tag ABC knows to relay this frame 500 because its serial number is the leftmost serial number in the string 521. Upon relaying the frame 500, tag "ABC" will remove its serial number from the message destination field 520 and place it in the message source field 530. Tag "ABC" will then relay this frame and tag "567" will be the only tag to receive and accept the frame 500 just re-broadcast by Tag "ABC", although other tags within the vicinity may receive it as well. Tag "567" knows to relay the frame 500 because now its serial number is the leftmost serial number in the string 521. Any other tags within the range of the broadcasting tag may receive the frame 500, but will not relay it because its serial number is not in the string 521. Eventually, the destination tag will receive the data frame 500 and process it. The destination tag will know to process it when it recognizes that its serial number is the rightmost serial number in the string 521 and/or the only serial number in the string 521.

The second string of serial numbers 522 is "D7E|124|*" which signifies that tag "D7E" will next relay the message. The '*' character represents a broadcast address, which means that any tag within the range of the preceding tag (in this example tag "124") should process the frame 500. The broadcast address is often utilized in forming the network and will be described in further detail in FIGS. 8 and 9.

Each tag serial number may be communicated with the binary equivalent of the ASCII character, or hexadecimal representation, of each character of the serial number. So for the example of "D7E," three octets would be necessary, one for each character in the serial number. Each serial number, in this embodiment, is delimited by the '|' character, although some other character may be used. The ultimate length of any one string of serial numbers in the message destination field 520 may be limited by the temporary memory in the tags. The length of the string of serial numbers also limits the number of intermediate tags in a communication, which limits the overall width of the network of wireless RFID tags.

In the case of a reply communication from a tag to the RMS, the RMS identifier, or address, may be characterized by the characters 'RMSx' where 'x' represents a sequence of characters unique to that particular RMS.

The message source field 530 identifies the source of the frame 500, as well as the intermediate tags that have relayed the frame 500 by conveying the serial numbers of the source and intermediate tags in a string. This is similar to that of the message destination field 520. An example string is provided that is "4C2|RMSx" which indicates that "RMSx" is the source of the frame 500, and tag "4C2" has relayed the frame 500. As mentioned, the 'x' in 'RMSx' would be a unique sequence of characters identifying a particular RMS. When a tag relays the frame 500, it adds its own serial number, or identifier, to the beginning of the string. Once the frame 500 has reached the destination tag, the destination tag, in replying, simply takes the string of serial numbers stored in the source field 530 and places it in the destination field 520. This information, in a reply message back to an RMS, is also used by the RMS to form the network.

The payload 540 of the frame 500 includes the information that is to be conveyed from source to destination. In most cases where an RMS is communicating to a destination tag in its network, the information will be a command. The destination tag will in turn, reply with a receipt of the command in a reply communication. Generally, the payload 540 can be filled with several tokens delimited by a space. Several examples are provided of various commands that may be communicated in the payload 540. For instance, a first command 541 is "CMD=TELL" which would be found in a data frame 500 sent from an RMS to a destination tag. The TELL command instructs the destination tag to retrieve the information stored in non-volatile memory, such as the tag serial number 418, and/or its location coordinates 414 (See FIG. 6). A second command 542 is "CMD=SET M=60 THI=140 TLO=39" which again would be in a communication from the RMS to a destination tag. The SET command instructs the destination tag to set its sensor operating parameters to the prescribed values. In this example, setting the time between sensor readings to 60 minutes (M=60), setting the high temperature threshold to 140° F. (THI=140), and the low temperature threshold to 39° F. (TLO=39). As discussed in FIG. 8 this information may be stored in the memory 410 of the tag 400 in the sensor information section 412. The second command 542 contains several tokens (i.e., CMD=SET, M=60, THI=140, TLO=39) all delimited with a space. In practice, multiple commands with multiple tokens could be sent in the payload 540 of one frame 500. A reply 543 to the SET command 542 is simply "SET" which is communicated from destination tag to the RMS. The replies to certain commands are simply acknowledgments and affirmations of the command. To other commands, pertinent information, such as the sensor readings or the coordinate locations could be communicated in the reply message.

The error-checking field 550 is used for data integrity of the frame 500. Any, conventional error-checking scheme could be utilized, such as a Checksum, or a CRC.

The trailer 560 indicates the end of the frame 500. In this embodiment, the trailer 560 is simply a single carriage return character, although another predetermined character could be used.

In the discussion that follows, flowcharts are provided. It is to be understood that any process steps or blocks in these flowcharts represent modules, segments, or portions of code that include one or more executable instructions for implementing specific logical functions or steps in the process. It will be appreciated that, although particular example process steps are described, alternative implementations are feasible and steps may be executed out of order from that shown or discussed, including substantially concurrently or in reverse order, depending on the functionality involved. Moreover, various examples of systems and devices configured to perform these methods have been included for illustrative purposes. It will be appreciated that, although these are the only examples provided, other systems and devices not exemplified could be configured to perform these methods.

FIG. 8 is a flowchart illustrating a method 600 of operation of an RMS (e.g., RMS 150) in accordance with embodiments of the present invention. In practice, the method 600 could function free from user interaction, but more than likely would have some periodic user input. Furthermore, the steps of the method 600 may be initialized remotely by a central monitoring station (CMS).

The method 600 begins with a receiving command to form the network (step 602). As discussed earlier, a network of wireless RFID tags may be reformed on a programmed periodic basis, perhaps hourly, or daily. Once the RMS is triggered to form the network, the RMS begins forming the network (step 610) by sending out broadcasts to discover the wireless RFID tags in the network. This step will be further illustrated in detail in FIG. 9.

Once the RMS has received the replies from the tags in the network, the RMS is configured to map out the network (step 620). Step 620 may encompass several algorithms to produce the shortest communication links required for each tag in the network. The algorithms also may map the network such that the communications are more evenly spread across the network, so as to avoid depending on a select few key positioned tags in the network. For instance, tags closest to the RMS in a given direction would experience more traffic, than others, thus resulting in quicker power consumption. The algorithms incorporated into step 620, can reconfigure the communication links to spread out the burden over other tags. Once the network has been formed and mapped, the RMS may return to an idle mode 660. Forming and mapping the network helps to track the existence and relative location of the tags in the network.

It should be noted that the network may be reformed periodically. The term periodically, in the context of this document, should be construed to mean performing in a manner more than once with some type of algorithmic expression of its frequency. For example, forming the network may be performed every hour, whereby the time between successive reformings would be constant. Alternatively, the time between reformings may be in a pseudo-random fashion, for example, ranging from five minutes to sixty minutes. Another feasible alternative is reforming the network more often during busiest shipping hours, such as during the day and reforming the network less often during the night.

Several times between reforming the network, the tags of the network may be polled for their status, such as environmental status and location. Once the RMS has been triggered to poll the network (step 604), the network may be polled (step 630). This step is described in further detail in FIG. 10, but in brief, any environmental parameter exceedances, as well as location coordinate information may be requested of each tag in the network. The RMS then receives responses conveying this information from the tags in the network. The RMS can then record and report the status of the assets by communicating, for example, the exceedance information, to the CMS (step 640). Upon recording and reporting the status of the assets, the RMS may return back to the idle mode 660.

Every so often the RMS may be triggered to send a message to a particular tag in the network (step 606). This may be enabled by a user operating the RMS, or it may be enabled remotely by the CMS. The message that is to be sent to the particular tag may be a command requesting information about the tag, or it may be a command to store information also being sent. For example, the tag's new location may be programmed by the RMS, or new environmental thresholds may be communicated to the tag. Sending a message requires preparing the message (step 650). This includes building the appropriate data frame(s) to convey the message. The RMS can populate the message destination field 520 (See FIG. 7) with the appropriate destination tag as well as intermediate tags. This information is available to the RMS upon forming and mapping the network (step 610 and 620). Alternatively, the RMS can send out a broadcast message to the destination tag, without knowing the intermediate tags necessary to convey the information.

Once prepared, the message can be sent (step 652). Eventually, the RMS will receive a response (step 654) and record the response (step 656). This step may require communicating the information along to the CMS. Once complete, the RMS can return back to the idle mode 660.

FIG. 9 is a flowchart illustrating a method 610 of forming a network of wireless RFID tags of the method of FIG. 8. The method 610 encompasses the process by which the RMS forms and periodically reforms the network, as discussed in FIG. 8, to properly track the existence and relative location of the tags, and thus the assets, within the network.

The method 610 begins with an initialization (step 611). At this point, a counter may be initialized to '0.' The counter tracks the levels in the network which signifies the number of tags necessary to communicate to a destination tag. So, when the counter initialized to '0,' the RMS is looking for the tags within the immediate range of the RMS, thus requiring zero intermediate tags. As the counter increases, the width of the network increases, from zero intermediate tags, to one intermediate tag, to two intermediate tags, and so on, until no new tags are found in an iteration of the method 610. The method as described illustrates the use of a breadth-first search (BFS). The BFS is also useful in determining the shortest communication path to each tag which are determined in step 620 (See FIG. 8).

To search for tags at the current level, the RMS broadcasts out a 'PING' command to any tags that are within its range (step 612). To accomplish this, the RMS can populate the message destination field of the data frame with a broadcast address, '*'. By including only one '*', the tags within the immediate range of the RMS will receive the command. Each of these tags will then respond to the 'PING' command. At this point, the RMS begins collecting the responses (step 613) and records the tags that have responded. If any new tags respond (step 614) (in the first iteration, all of the tags that respond will be new) the counter is incremented (step 615).

The process is repeated by sending a 'PING' command out for each tag that was discovered in the previous level. For example, if a level '0' 'PING' command returned three tags, A, B, and C, then three new 'PING commands' will be sent out during the level '1' iteration. The three 'PING' commands would include in the message destination field 'A|*', 'B|*', and 'C|*'.

These messages will be reached by any tags that are within the range of any tags in the first level. These tags can reply to each 'PING' command they receive. Upon collecting these responses, the RMS can eliminate redundant replies. For example, a "Level 1" tag may receive more than one 'PING' command from more than one "Level 0" tag and so will reply to both. By reviewing the message source fields of the received messages, the RMS can recognize redundant replies. This information is also useful when mapping the network (step 620 of FIG. 8). If new tags have been recognized, the counter increments again, and the process repeats, until no new tags have been recognized. At this point, the process exits (step 616), and it is assumed that all the tags within the network have been discovered.

FIG. 10 is a flowchart illustrating a method 630 of polling a network of wireless RFID tags in accordance with embodiments of the present invention. The method 630 provides more detail to the step 630 of FIG. 8, which as discussed briefly, polls each of the tags in the network to find out the environmental conditions in which their assets are experiencing. Alternatively, the tags may be polled for location information.

The method 630 begins with a simple initialization step (step 631). The RMS, from forming and mapping a network, includes a list of the tags in the network. To properly poll these tags, the RMS must send out many messages, at least one for each tag. However, these messages cannot be sent out in a single burst, as it could overload the network due to an excessive number of relays by intermediate tags. Further, an excessive amount of wireless communications at any one time within a confined area, may cause problems. To transmit the wireless communications, electromagnetic radiation must be emitted by the transmitter. In some cases, too much electromagnetic radiation within a given area at any one time can cause a problem for radiation sensitive assets, such as ammunitions and explosives. To avoid this, the RMS can send out the polling signals to the network of tags over an extended period of time in a pseudo-random fashion, and in a manner that avoids too much radiation within a given area. So, the RMS will continue the method 630 provided there are more messages to be sent (step 632). Once the tags have been polled, the method 630 will end (step 638).

To poll each tag, a 'READINGS' command may be sent to each tag (step 633). The tag may then retrieve this information from its memory and reply back accordingly. As each reply is received by the RMS (step 634), the RMS can store the responses (step 635) as well as monitor for any threshold exceedances that have occurred (step 636). If a threshold exceedance has occurred, the pertinent information will be recorded and may be communicated to the CMS (step 637). Such pertinent information may include the time of exceedance, the specific tag that replied with the exceedance, and the location of the specific tag. The responses may also include the actual readings of the sensors, so if an exceedance is recognized, the sensor readings can be communicated to the CMS. Without an exceedance being detected, the information may or may not be recorded (depending on the specific configuration) nor communicated to CMS. This process continues until each desired tag has been polled for its readings.

Figure 11:
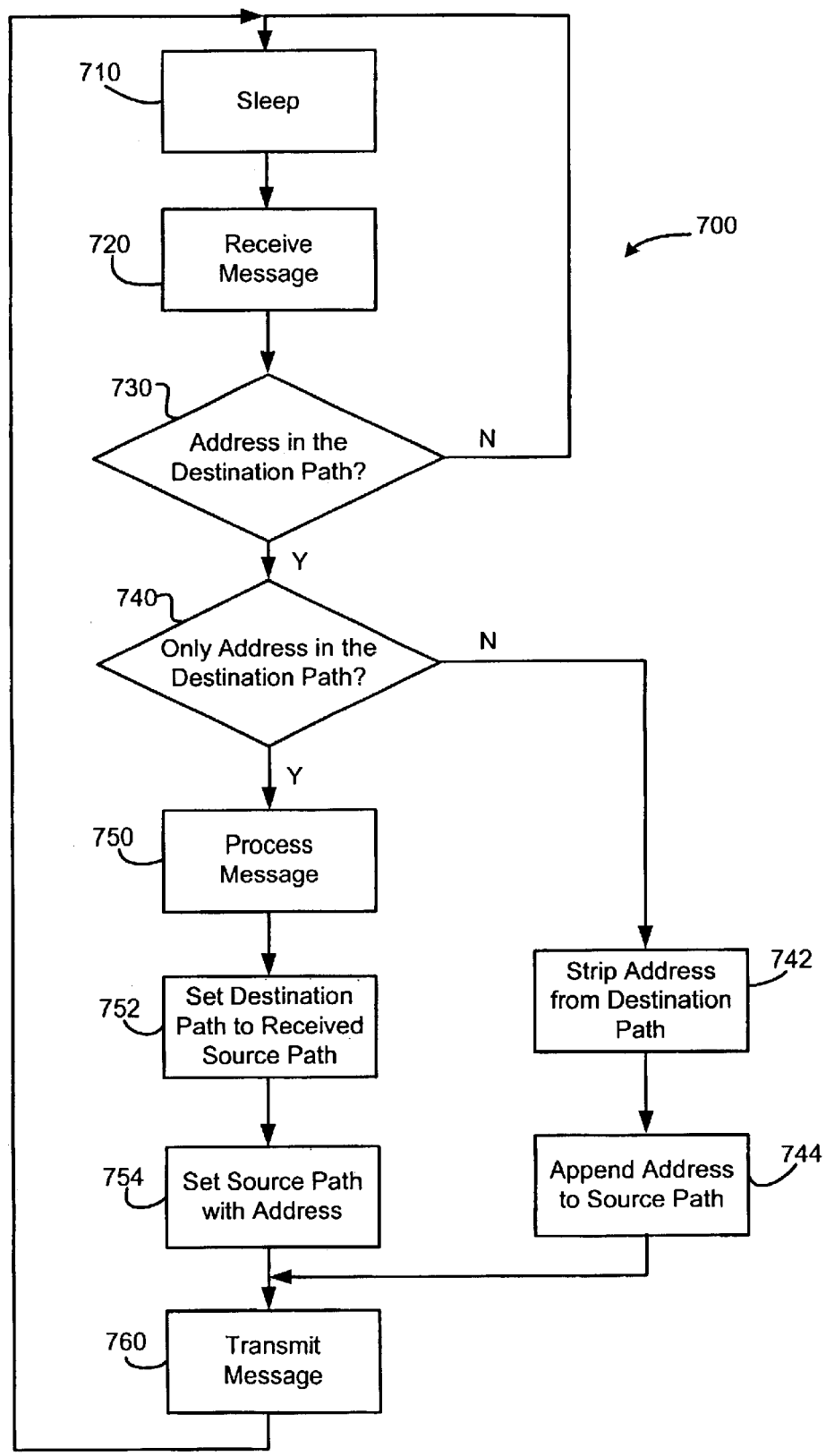
FIG. 11 is a flowchart illustrating a method of operation for a wireless RFID tag within a network of wireless RFID tags in accordance with embodiments of the present invention.

FIG. 11 is a flowchart illustrating a method 700 of operation for a wireless RFID tag within a network of RF tags in accordance with embodiments of the present invention. The method 700 assumes that the tag remains in a sleep mode 710 until it receives a communication. During the sleep mode 710 however, the tag may periodically take a reading of its sensors and store the readings until a request for them has been received.

Once the tag receives a message (step 720), the tag checks to see if its own address, designated by its unique serial number, is in the message destination field 520 of the received data frame 500 (FIG. 7) or message (step 730). Alternatively, the tag looks to see if a '*' address for a network wide broadcast is the leftmost address in the message destination field. In either case, the method 700 proceeds to step 740. If neither its unique serial number exists anywhere in the message destination field 520, nor a '*' exists at the leftmost address in the message destination field 520, the tag will then return to sleep mode 710, as the current message is neither for that tag nor requires that tag to relay the message.

Assuming the message should be processed by the tag, the tag then checks to see if the its address or the '*' is the only address in the message destination field 520 (step 740). If so, the tag must process the message according to the command sent in the message (step 750). If its own address or the '*' is not the only address in the message destination field 520, the tag recognizes that it must relay the message. To relay the message, the tag can strip the address from the message destination field 520 (step 742) and append the address to the message source field 530 (step 744). The message can then be re-transmitted (step 760).

If the address or the '*' is the only address in the message destination field 520, the tag will then process the message according to the command received in the payload (step 750) of the message, or data frame 500. Just prior to processing the message, the tag may perform an error check, using the error-checking field 550 of the message. Once processed, the tag can create a reply message by populating the message destination field 520 of the reply message with the information in the message source field 530 (step 752). The message source field can then be populated with the serial number of the tag (step 754). The payload of the reply message can then be appropriately configured to convey a receipt of the received message as well as communicate the requested information. The error-checking field 550 will be repopulated with the correct error-checking information. Once the message has been built, it can be transmitted back in the direction in which it came (step 760).

It should be emphasized that the above-described embodiments of the present invention, are merely possible examples of implementations, merely set forth for a clear understanding of the principles of the invention. Many variations and modifications may be made to the above-described embodiment(s) of the invention without departing substantially from the spirit and principles of the invention. For example, it will be appreciated by those skilled in the art that the particular format of the data frame 500 could be varied without departing from the functionality it affords. Additionally, although the present invention focuses on an implementation for tracking heavy assets across a supply chain, those skilled in the art will appreciate that other implementations of the present invention are foreseeable. For instance, automobiles may be monitored while on-site at a car dealership. All such modifications and variations are intended to be included herein within the scope of the present invention and protected by the following claims.

What is claimed is:

1. A system for monitoring assets, the system comprising:
   identification (ID) tags each related to an asset to be monitored, wherein each ID tag is capable of wirelessly communicating with other ID tags such that a communication path exists between an RMS and any ID tag in the system, either directly or via other ID tags; and
   an RMS that originates or is the end-destination, either directly or indirectly, of all communications transmitted by any ID tag in the system.

2. The system of claim 1, wherein the RMS and the ID tags are configured to communicate with a radio frequency (RF) communication protocol.

3. The system of claim 2, wherein the RMS and the ID tags are further configured to communicate via a variable length data frame.

4. The system of claim 3, wherein the variable length data frame comprises:
   a message destination field for storing a future communication path in which the data frame will travel between the RMS and a destination ID tag;
   a source destination field for storing a past communication path in which the data frame has traveled; and
   a payload field for storing information to be conveyed.

5. The system of claim 1, wherein each ID tag communicates with the RMS to convey the existence of the ID tag in the network.

6. The system of claim 5, wherein each ID tag of the network stores the location of the asset to which the ID tag is coupled.

7. The system of claim 5, wherein each ID tag communicates with the RMS to convey the location of the asset to which the ID tag is coupled.

8. The system of claim 1, wherein each ID tag further comprises:
   at least a first sensor each configured to sense an environmental condition of the asset to which the ID tag is coupled.

9. The system of claim 8, wherein the environmental condition that is sensed by the at least first sensor is temperature, pressure, humidity, radiation, or vibrations.

10. The system of claim 8, wherein each ID tag communicates with the RMS to convey data sensed by the at least first sensor.

11. The system of claim 1, further comprising:
    at least a first dummy ID tag not coupled to an asset, wherein the at least first dummy ID tag is configured to:
    wirelessly communicate with the ID tags in the network within a predetermined proximity; and
    relay communications from ID tags, such that a communication path is established between the RMS and any ID tag in the network, either directly or via other ID tags.

12. The system of claim 1, wherein the RMS is housed in a storage facility.

13. The system of claim 12, further comprising a second RMS positioned in a cargo container and wherein the network of ID tags is configured to communicate with the second RMS when placed within the cargo container.

14. The system of claim 13, further comprising a third RMS positioned on a shipping vessel and wherein the network of ID tags is configured to communicate with the third RMS when placed on the shipping vessel.

15. The system of claim 14, wherein the second and third RMS are configured to communicate with a central monitoring station (CMS) via a satellite communication link.

16. A method of monitoring assets across a supply chain, whereby each asset has an RFID tag coupled thereto and whereby the RFID tags can communicate via other RFID tags, the method comprising:
    forming a network of RFID tags by conducting a BFS for all tags within proximity, whereby existence in the network conveys the existence and location of the corresponding assets in the supply chain; and
    polling the network of RFID tags to monitor the environmental conditions surrounding the corresponding assets.

17. The method of claim 16, further comprising:
    establishing a shortest communication path to each RFID tag in the network based upon the results of the BFS.

18. The method of claim 16, wherein polling the network comprises:
    transmitting a communication message to each tag in the network of RFID tags, either directly or via intermediary RFID tags in the network; and
    receiving a reply message from each RFID tag in the network, either directly or via intermediary RFID tags in the network, whereby each reply message conveys the environmental conditions experienced by the asset to which the RFID tag is coupled.

19. The method of claim 16, wherein forming the network and polling the network is performed periodically.

20. A computer readable medium having a program for monitoring assets across a supply chain, whereby each asset has an RFID tag coupled thereto, the program comprising:
    logic configured to form a network of RFID tags by conducting a BFS for all tags within proximity, whereby existence in the network conveys the existence and location of the corresponding assets in the supply chain; and
    logic configured to poll the network of RFID tags to monitor the environmental conditions surrounding the corresponding assets.

21. The program of claim 20, wherein the logic configured to form the network further comprises:
    logic configured to map a network path to each RFID tag in the network.

22. The program of claim 20, wherein the logic configured to poll the network comprises:
    logic configured to generate a communication message to be transmitted to each tag in the network of RFID tags, either directly or via intermediary RFID tags in the network; and
    logic configured to process a received reply message from each RFID tag in the network, either directly or via intermediary RFID tags in the network, whereby each reply message conveys the environmental conditions experienced by the asset to which the RFID tag is coupled.

23. The program of claim 20, wherein the logic configured to form the network is further configured to periodically form the network and the logic configured to poll the network is further configured to periodically poll the network.

24. A system for monitoring assets, the system comprising:
    a plurality of RFID tags, each related to an asset to be monitored, wherein each RFID tag comprises:
    means for communicating with other RFID tags communications originating from or destined for an RMS; and an RMS comprising:

means for conducting a breadth-first search (BFS) to identify the plurality of RFID tags and to establish a shortest communication path to each RFID tag.

25. The system of claim 24, wherein each RFID tag further comprises:

means for sensing at least a first environmental condition of the corresponding asset.

26. The system of claim 25, wherein the RMS further comprises:

means for periodically polling the plurality of RFID tags to monitor environmental conditions surrounding the corresponding assets.

27. The system of claim 26, wherein the means for periodically polling comprises:

means for transmitting a communication message to each tag either directly or via intermediary RFID tags; and means for receiving a reply message from each RFID tag, either directly or via intermediary RFID tags, whereby each reply message conveys the environmental conditions experienced by the corresponding asset.

28. The system of claim 24, wherein the means for performing a BFS comprises:

means for broadcasting a communication message to be received by any RFID tag within immediate proximity of the RMS or within the proximity of any intermediary RFID tag; and means for receiving a reply message from any RFID tag within immediate proximity or within the proximity of any intermediary RFID tag;

whereby multiple intermediary RFID tags may be utilized to relay either message.

29. The program of claim 20, wherein the logic configured to form the network further comprises:

logic configured to map a shortest network path to each RFID tag in the network.

* * * * *

UNITED STATES PATENT AND TRADEMARK OFFICE
CERTIFICATE OF CORRECTION

PATENT NO. : 6,972,682 B2 Page 1 of 1
APPLICATION NO. : 10/324422
DATED : December 6, 2005
INVENTOR(S) : Lareau et al.

It is certified that error appears in the above-identified patent and that said Letters Patent is hereby corrected as shown below:

TITLE PAGE, ITEM (75) "Inventors: Neil William Lareau, Duluth, GA (US); Ronald Earl Wagner, Winter Springs, FL (US); Robert W. Baggerman, Atlanta, GA (US); Gisele Welch, Atlanta, GA (US)" should read -- Inventors: Ronald E. Wagner, Winter Springs, FL (US); Neil W. Lareau, Duluth, GA (US); Robert W. Baggerman, Atlanta, GA (US); Gisele Welch, Atlanta, GA (US); Benjamin Medlin, Jr., Woodstock, GA (US) --.

Signed and Sealed this

Twenty-sixth Day of February, 2008

JON W. DUDAS
*Director of the United States Patent and Trademark Office*